United States Patent
Enomoto

(10) Patent No.: US 7,506,744 B2
(45) Date of Patent: Mar. 24, 2009

(54) CHANGEOVER SYSTEM

(75) Inventor: Masahiro Enomoto, Shiga (JP)

(73) Assignee: Daifuku Co., Ltd. (JP)

( * ) Notice: Subject to any disclaimer, the term of this patent is extended or adjusted under 35 U.S.C. 154(b) by 395 days.

(21) Appl. No.: 11/386,994

(22) Filed: Mar. 22, 2006

(65) Prior Publication Data
US 2006/0219522 A1    Oct. 5, 2006

(30) Foreign Application Priority Data
Mar. 28, 2005  (JP) .............................. 2005-090326
Mar. 28, 2005  (JP) .............................. 2005-090330

(51) Int. Cl.
*B65G 47/46* (2006.01)
(52) U.S. Cl. .................. 198/370.02; 198/890
(58) Field of Classification Search ............ 198/370.02, 198/890, 890.1
See application file for complete search history.

(56) References Cited

U.S. PATENT DOCUMENTS

| | | | | |
|---|---|---|---|---|
| 5,127,510 | A * | 7/1992 | Cotter et al. | ............ 198/370.02 |
| 5,131,522 | A | 7/1992 | Fujio | ............................ 198/370 |
| 5,595,279 | A * | 1/1997 | Wilkins et al. | ......... 198/370.02 |
| 6,139,240 | A | 10/2000 | Ando | .......................... 414/267 |
| 6,283,271 | B1 * | 9/2001 | van den Goor | ......... 198/370.02 |
| 6,860,376 | B1 | 3/2005 | Heit et al. | .............. 198/370.02 |
| 6,866,136 | B2 * | 3/2005 | Veit et al. | ............... 198/370.02 |
| 6,910,567 | B2 * | 6/2005 | Van Den Goor | ....... 198/370.02 |
| 2004/0159526 | A1 | 8/2004 | Veit et al. | .............. 198/370.02 |
| 2005/0029077 | A1 | 2/2005 | Enomoto | ..................... 198/618 |

FOREIGN PATENT DOCUMENTS

| | | |
|---|---|---|
| EP | 0 484 150 | 5/1992 |
| EP | 0 602 694 A1 | 6/1994 |
| JP | 04-60918 | 5/1992 |
| JP | 04-144827 | 5/1992 |
| JP | 05-03215 | 1/1993 |
| JP | 05-032309 | 2/1993 |
| JP | 5-42220 | 6/1993 |
| JP | 06-048557 | 2/1994 |
| JP | 6-115654 | 4/1994 |
| JP | 06-115680 | 4/1994 |
| JP | 06-127671 | 5/1994 |
| JP | 07-061570 | 3/1995 |

(Continued)

OTHER PUBLICATIONS

European Search Report from corresponding EP 06 07 5617 (2 pgs.) dated Jan. 31, 2007.

(Continued)

*Primary Examiner*—Mark A Deuble
(74) *Attorney, Agent, or Firm*—Kusner & Jaffe

(57) ABSTRACT

In a changeover system of the present invention, the upper part of the transverse pushing action section of the article transverse pushing body is formed as a tilted upper surface with a middle portion in the front rear direction being tilted forward and downward and a front end portion is formed as a leading end upper surface with gradual inclination conjointly with the tilted upper surface. As a result, the leading end upper surface with gradual inclination smoothly enters below the article, the article can be lifted by the tilted upper surface, and the prescribed transverse movement can be implemented without squeezing the article.

23 Claims, 19 Drawing Sheets

FOREIGN PATENT DOCUMENTS

| | | |
|---|---|---|
| JP | 07-149425 | 6/1995 |
| JP | 07-232825 | 9/1995 |
| JP | 09-058857 | 3/1997 |
| JP | 11-129839 | 5/1999 |
| JP | 11-255326 | 9/1999 |
| JP | 2000-118699 | 4/2000 |
| JP | 2000-128343 | 5/2000 |
| JP | 2001-301957 | 10/2001 |
| JP | 2002-370820 | 12/2002 |
| JP | 2003-128235 | 5/2003 |
| JP | 2004-354129 | 12/2004 |
| WO | WO 00/41956 | 7/2000 |

OTHER PUBLICATIONS

Vogl, Von Wolfgang, "Hochleistungssorter IM Test" Technische Rundschau, Edition Colibri AG., Wabern, Ch, vol. 83, No. 38, Sep. 20, 1991, pp. 84-91, XP000240738.

Partial European Search Report from corresponding EP 06 07 5617 (2 pgs.).

\* cited by examiner

CHANGEOVER SYSTEM

FIELD OF THE INVENTION

The present invention relates to a changeover system suitable for transferring articles that are conveyed, for example, on a main conveying path to a branch conveying path provided outwardly at a side of the main conveying path.

BACKGROUND OF THE INVENTION

Japanese Patent Application Laid-open No. 2003-128235 discloses a structure, wherein multiple article support bodies oriented in the direction perpendicular to a main conveying path are attached between a pair of left and right endless rotary bodies installed along the main conveying path, guided bodies are provided on the rear surface side of article transverse pushing bodies guided by the article support bodies, and a guide device for guiding the guided bodies is provided. The article support body has a flat article-carry plate section, a pair of leg plate sections installed consecutively in the direction of the main conveying path from the middle section of the rear surface of the article carry plate section, a front plate section extending downward from the front end of the article carry plate section, a step-like front bottom plate section connecting the lower end of the front plate section with the lower end of the front leg plate section, a rear plate member extending downward from the rear end of the article carry plate section, and a step-like rear bottom plate section connecting the lower end of the rear plate section with the lower end of the rear leg plate section.

The article transverse pushing body is fitted over the article support body and is formed to have a rectangular tubular shape from an upper plate member facing the article carry plate section from above, a front plate member facing the front plate section from the front, a rear plate member facing the rear plate section from behind, and a bottom plate member facing the bottom plate section and the like from below. A guided section that is joined and slidably guided between the two leg plate sections is formed in the bottom plate member. The upper part of the action section comprises a front-half portion that is tilted linearly so as to rise toward the rear section, a horizontal rear-half portion connected to the upper end of the front-half portion, and a vertical rear end surface portion.

Furthermore, branch conveyors forming branch paths that are inclined outwardly and downwardly with respect to the main conveying path are provided outwardly at both sides of the main frame. Furthermore, above a step on the inner side where the endless rotary bodies are installed and the outward guide rail section is formed in the upper frame member, an upper cover is disposed for covering the step from above.

With the configuration of this conventional example, an article is supported and conveyed with a group of article support bodies that are moved as a unit driving the endless rotary bodies, and the guided bodies are guided by a group of guide devices that move the article transverse pushing bodies in this process, thereby enabling the group of article transverse pushing bodies to push the articles in the transverse direction. As a result, the articles are moved above the upper cover and transferred to the branch path.

Japanese Patent Application Laid-open No. H6-115680 discloses a top part of a shoe, wherein, the surface of the front part of the surface section is formed as a linear tilted surface that descends toward the front surface section with the transition to the front surface section, and the front edge of the tilted surface is formed so as to be positioned below the conveying surface at an angle steeper than the tilting angle of the tilted surface. Furthermore, the surface of the rear part of the surface section is formed as a horizontal surface connected to the upper surface of the front section surface and the rear surface is formed as a linear tilted surface that descends with the transition to the rear end and a vertical rear surface.

However, with the configuration of the aforementioned conventional example (Japanese Patent Application Laid-open No. 2003-128235), when the supplied articles are from a soft easily deformable material or when the orientations of the articles are disordered, there is a risk of the article being squeezed between a vertical rear-end surface portion of an upper article transverse pushing body and a linear tilted front-half portion of the rear article sidewise pushing body at the time the transverse pushing is started.

Similarly, with the configuration of the aforementioned another conventional example (Japanese Patent Application Laid-open No. H6-115680), there is also a risk of the article being squeezed between a linear tilted surface or vertical rear surface of the upper shoe and the front edge formed at a steep angle in the rear shoe. Furthermore, the article or article transverse pushing body (shoe) is damaged by squeezing.

Furthermore, with the configuration of the aforementioned conventional example (Japanese Patent Application Laid-open No. 2003-128235), the upper surface of the upper cover or the branch conveying surface (upper surface of the rollers) of the branch path is positioned at a level lower than the upper surface of the article support bodies. For this reason, the article is moved to the branch with a drop, that is, shaken in the vertical direction, with respect to the upper surface of the upper cover or the branch conveying surface of the branch path and, therefore, there is a risk of the article being damaged or the article noise being generated. Moreover, for example, if the article itself is soft or when the packaging material of the article is soft and hangs down at the upper surface due to flexion thereof, when the article is transferred from the upper surface of the article support body to the upper surface of the upper cover during the branch movement, the hanging portion thereof enters below the cover and cannot be moved above the upper cover.

SUMMARY OF THE INVENTION

An advantage of the present invention is a changeover system in which the desired movement induced by transverse pushing can be implemented without squeezing the article.

A second advantage of the present invention is a changeover system in which the strength of the article transverse pushing body can be increased and design capability can be improved.

A third advantage of the present invention is a changeover system in which the strength of the article transverse pushing body can be increased and stable movement thereof can be ensured.

A fourth advantage of the present invention is a changeover system in which the article transverse body is prevented from being caught on other components.

A fifth advantage of the present invention is a changeover system in which an article supplied from the article support body can be transferred to a branch reliably and smoothly without shaking in the vertical direction.

A sixth advantage of the present invention is a changeover system in which linking of the article support body side and endless rotary body is conducted rapidly and in an easy manner.

A seventh advantage of the present invention is a changeover system in which the movement of the article support body in a forward-homeward path is conducted in a stable state.

In order to attain the above-described first advantage, the first invention provides a changeover system comprising a pair of left and right endless rotary bodies installed along a main conveying path, a multiplicity of article support bodies attached between the endless rotary bodies and having the direction perpendicular to the main conveying path as a lengthwise direction, and an article transverse pushing body fitted over the article support body and guided thereby, wherein the article transverse pushing body is formed by an upper plate member, a front plate member extending downward from the front end of the upper plate member, a rear plate member extending downward from the rear end of the upper plate member, a bottom plate member disposed between the lower ends of the front plate member and rear plate member, and a transverse pushing action section provided above the upper plate member, the upper part of the transverse pushing action section is formed by the tilted upper surface in which the middle portion in the front-rear direction is tilted forward and downward, and a leading-end upper surface provided at a gradual angle with respect to the tilted upper surface is formed in the front end portion continuous with the tilted upper surface.

With the configuration of the above-described first invention, moving a group of article support bodies on the main conveying path by the movement of both endless rotary bodies makes it possible to convey the articles supplied onto the group of article support bodies of the leading end section on the main conveying path, and by moving the article transverse pushing body in the lengthwise direction of the article support body the article is pushed sidewise and delivered outwardly to the side of the main conveying path. In this case, for example, when an article assumes a squeezed state between the front and rear article transverse pushing bodies at the time the transverse pushing is started, the leading-end upper surface provided at a gentle angle smoothly enters below the article and the article can be lifted by the tilted upper surface. As a result, the desired movement induced by transverse pushing can be implemented without squeezing, thereby enabling the prevention of the article and article transverse pushing body from damage.

In the first preferred implementation mode of the changeover system of the first invention, the leading-end upper surface is formed to have a concave circular arc shape and to rise gradually with a small inclination, and the tilted upper surface is formed to have a straight linear shape and to rise gradually at an inclination angle larger than that of the leading-end upper surface.

With the first preferred implementation mode, for example, when an article assumes a squeezed state between the front and rear article transverse pushing bodies at the time the transverse pushing is started, the leading-end concave circular-arc upper surface provided at a gentle angle can smoothly enter below the article and the article can be lifted by the tilted upper surface.

In the second preferred implementation mode of the changeover system of the first invention, a trailing-end portion is formed at the corner surface in the form of a convex circular arc in the upper part of the transverse pushing action section.

With the second preferred implementation mode, for example, when carry-in and carry-out conveying means are installed in front and behind the changeover system, if the article transverse pushing body in a reverse state thereof is brought into contact with the conveying means due to erroneous operation or the like, the conveying means can be prevented from damage because the corner surface comes into contact.

In the third preferred implementation mode of the changeover system of the first invention, in the upper part of the transverse pushing action section, the leading-end upper surface that has a concave circular arc shape and rises gradually with a small inclination, the tilted upper surface that has a straight linear shape and rises gradually at an inclination angle larger than that of the leading-end upper surface, a front convex circular-arc upper surface that has a convex circular-arc shape and rises gradually, a rear circular-arc upper surface that has a convex circular-arc shape and forms an apex section, a corner surface that has a convex circular-arc shape and descends, and a convex circular-arc rear surface that has a convex circular-arc shape and descends are formed continuously from the front to the back.

With the third preferred implementation mode, due to the continuous formation, the entire structure has a curved shape and good external appearance in a side view thereof.

In the fourth preferred implementation mode of the changeover system of the first invention, in the side part of the transverse pushing action section, left and right corners of the front end section are formed as circular-arc side surfaces, and a transverse pushing abutment member is provided in a state such that the transverse pushing abutment surface is connected to the rear end of the circular-arc side surface.

With the fourth preferred implementation mode, the circular-arc side surface makes it possible to enter below the article more smoothly. Furthermore, almost the entire length of the side section in the transverse pushing action section is along the transverse pushing action surface, stable movement induced by transverse pushing can be realized, the gap between the transverse pushing action sections in the front and rear article transverse pushing bodies can be reduced, and the prescribed movement induced by the transverse pushing can be realized in a state without the articles entering below the cover body.

In the fifth preferred implementation mode of the changeover system of the first invention, both side surfaces of the transverse pushing action section are formed by sidewise tilted surfaces that have a rising shape and are tilted by the rear part thereof toward the other side surface with respect to the front part, a transverse pushing abutment member in which the transverse pushing abutment surface is tilted by the rear part thereof toward the other side surface with respect to the front part is detachably attached to the portions of those sidewise tilted surfaces, protruding sections that can be inserted to the transverse pushing action section side are formed integrally in a plurality of front and rear locations on the inner surface side of the transverse pushing abutment member, downward locking sections are formed in a protruding conditions in those protruding sections, a group of engagement hole sections that can be freely engaged with a group of locking sections are formed in a plurality of front and rear locations on the left side and in a plurality of front and rear locations on the right side in the upper plate member, and the group of the engagement hole sections of the left row and the group of the engagement hole sections of the right row are formed to have mutually different shapes in the front-rear direction.

With the fifth preferred implementation mode, the attachment of the transverse pushing abutment member can be securely conducted by engaging the group of locking sections with the group of locking hole section, and making the engagement hole sections to have different shapes in the front-rear direction in the right row and left row makes it possible to form the group of engagement hole sections in an easy manner.

In the sixth preferred implementation mode of the changeover system of the first invention, the transverse pushing action section comprises a top plate member that covers the upper plate member from above and rib plate members located in the left-right direction and linking the top plate member to the upper plate member, a plurality of the rib plate members located in the left-right direction are provided in the front-row direction, and the group of the engagement hole sections of the left row and the group of the engagement hole sections of the right row are formed to have mutually different shapes in the front-rear direction, avoiding those rib plate members located in the left-right direction.

With the sixth preferred implementation mode, the strength of the transverse pushing action section can be increased by the rib plate members located in the left-right direction.

In order to attain the above-described second advantage, the second invention provides a changeover system comprising a pair of left and right endless rotary bodies installed along a main conveying path, a multiplicity of article support bodies attached between the endless rotary bodies and having the direction perpendicular to the main conveying path as a lengthwise direction, and an article transverse pushing body fitted over the article support body and guided thereby, wherein the article transverse pushing body is formed by an upper plate member, a front plate member extending downward from the front end of the upper plate member, a rear plate member extending downward from the rear end of the upper plate member, a bottom plate member disposed between the lower ends of the front plate member and rear plate member, and a transverse pushing action section provided above the upper plate member, the transverse pushing action section comprises a top plate member that covers the upper plate member from above and rib plate members located in the left-right direction and linking the top plate member to the upper plate member, and concave sections located in the left-right direction are formed in the upper surface of the top plate member in a position above the rib plate members located in the left-right direction.

With the configuration of the above-described second invention, moving a group of article support bodies on the main conveying path by the movement of both endless rotary bodies makes it possible to convey the articles supplied onto the group of article support bodies of the leading end section on the main conveying path, and by moving the article transverse pushing body in the lengthwise direction of the article support body the article is pushed sidewise and delivered outwardly to the side of the main conveying path. In this case, the strength of the transverse pushing action section can be increased by the rib plate members located in the left-right direction and the design capability can be improved due to the presence of the concave sections.

In the first preferred implementation mode of the changeover system of the second invention, the concave sections are formed along the entire length in the left-right direction.

With the first preferred implementation mode, the design capability can be improved by effectively using the concave sections appearing along the entire length in the portions of the rib plate members located in the left-right direction when a transverse pushing action section is molded from a resin.

In order to attain the above-described third advantage, the third invention provides a changeover system comprising a pair of left and right endless rotary bodies installed along a main conveying path, a multiplicity of article support bodies attached between the endless rotary bodies and having the direction perpendicular to the main conveying path as a lengthwise direction, and an article transverse pushing body fitted over the article support body and guided thereby, wherein the article transverse pushing body is formed by an upper plate member, a front plate member extending downward from the front end of the upper plate member, a rear plate member extending downward from the rear end of the upper plate member, a bottom plate member disposed between the lower ends of the front plate member and rear plate member, and a transverse pushing action section provided above the upper plate member, the upper plate member of the article transverse pushing body and the top plate member of the transverse pushing action section are formed to have a trapezoidal shape that has a large width in the front end section and then gradually narrows to have a small width in the rear end section in the plan view thereof, and the bottom plate member is formed as a rectangular plate and protrudes at both sides in the lengthwise direction with respect to the upper plate member and top plate member that have a trapezoidal shape.

With the configuration of the third invention, moving a group of article support bodies on the main conveying path by the movement of both endless rotary bodies makes it possible to convey the articles supplied onto the group of article support bodies of the leading end section on the main conveying path, and by moving the article transverse pushing body in the lengthwise direction of the article support body makes it possible to push the article sidewise and deliver it outwardly to the side of the main conveying path. In this case, the width of the structure facing the article support body can be increased by causing the bottom plate member of a rectangular shape to protrude at both sides in the lengthwise direction with respect to the upper plate member or top plate member that have a trapezoidal shape.

In the first preferred implementation mode of the changeover system of the third invention, the front plate member of the article transverse pushing body is formed as a rectangular plate with a width slightly less than that of the front end section of the upper plate member, the rear plate member is formed to have an inverted T shape by a narrow upper half section joined to a narrow rear end section of the upper plate member and a trapezoidal lower half section that gradually expands to assume a width that is equal to the width of the front plate member, and the bottom plate member is formed to have a rectangular shape joined to the lower ends of the front plate member and lower plate member.

With the first implementation mode, the article transverse pushing body in which the bottom plate of a rectangular shape is caused to protrude at both sides in the lengthwise direction can be easily formed in a stable state.

In the second preferred implementation mode of the changeover system of the third invention, in the article support body, a guide section is formed between the leg plate sections by providing a pair of leg plate sections in a connected row arrangement in the direction of the main conveying path from the middle section of the low surface of the article carry plate section, in the article transverse pushing body, a guided section that is to be mated with the guide section is formed on the upper surface side of the bottom plate member, the guided section has a rectangular shape elongated in the lengthwise direction in the plan view thereof and a stopper section for controlling the movement limits in the lengthwise direction is formed by a portion protruding in the widthwise direction of the bottom plate member.

With the second implementation mode, the stopper section on the side of the article transverse pushing body can be easily formed, and the transverse movement induced by the article transverse body can be sufficiently implemented by controlling the movement limits in the lengthwise direction by the abutment of the stopper section.

In order to attain the above-described fourth advantage, the fourth invention provides a changeover system comprising a pair of left and right endless rotary bodies installed along a main conveying path, a multiplicity of article support bodies attached between the endless rotary bodies and having the direction perpendicular to the main conveying path as a lengthwise direction, and an article transverse pushing body fitted over the article support body and guided thereby, wherein the article transverse pushing body is formed by an upper plate member, a front plate member extending downward from the front end of the upper plate member, a rear plate member extending downward from the rear end of the upper plate member, a bottom plate member disposed between the lower ends of the front plate member and rear plate member, and a transverse pushing action section provided above the upper plate member, and the bottom surface of the bottom plate member is flat.

With the configuration of the fourth invention, moving a group of article support bodies on the main conveying path by the movement of both endless rotary bodies makes it possible to convey the articles supplied onto the group of article support bodies of the leading end section on the main conveying path, and by moving the article transverse pushing body in the lengthwise direction of the article support body makes it possible to push the article sidewise and deliver it outwardly to the side of the main conveying path. Furthermore, because the lower surface of the bottom plate member is flat, it is prevented from being caught on other components.

In order to attain the above-described fifth advantage, the fifth invention provides a changeover system comprising a pair of left and right endless rotary bodies installed along a main conveying path and a multiplicity of article support bodies attached between the endless rotary bodies and having the direction perpendicular to the main conveying path as a lengthwise direction, wherein the endless rotary bodies are supported and guided on the side of the main frame via guided members, a cover body for closing the endless rotary bodies from above is disposed in the upper part of the main frame, the uppermost surface of the cover body is positioned at the same level as the upper surface of the article support body, and the inner end portion is formed by a tilted upper surface that descends with respect to the upper surface of the article support body.

With the configuration of the fifth invention, moving a group of article support bodies on the main conveying path by the movement of both endless rotary bodies makes it possible to convey the articles supplied onto the group of article support bodies of the leading end section on the main conveying path and by moving the article transverse pushing body in the lengthwise direction of the article support body makes it possible to push the article sidewise and deliver it outwardly to the side of the main conveying path. The movement of the endless rotary bodies in this process is executed by supporting and guiding on the main frame side via the guided members, thereby enabling the movement of the article support bodies in a stable state. Furthermore, the adhered dust etc. is prevented from falling onto the endless rotary body because the article located on the article support body moves above the cover body.

Furthermore, because an article supplied from the article support body can be moved outwardly at the side via the uppermost surface positioned at the same level, the article can be moved to a branch smoothly without shaking in the vertical direction. As a result, damage of the article occurrence of noise can be prevented. Furthermore, for example, even if the article itself is soft or the packaging material of the article is soft and hangs down, coming into contact with the upper surface, due to flexion thereof, when the article is transferred from the upper surface to the uppermost surface during the branch movement, it can be received by the tilted upper surface and guided toward the uppermost surface side. As a result, the hanging portion is prevented from entering below the cover body and movement to a branch can be reliably implemented above the cover body.

In the first preferred implementation mode of the changeover system of the fifth invention, an article transverse pushing body fitted over the article support body and guided thereby is provided at the article support body.

With the first implementation mode, moving a group of article support bodies on the main conveying path by the movement of both endless rotary bodies makes it possible to convey the articles supplied onto the group of article support bodies of the leading end section on the main conveying path and by moving the article transverse pushing body in the lengthwise direction of the article support body makes it possible to push the article sidewise and deliver it outwardly to the side of the main conveying path.

In the second preferred implementation mode of the changeover system of the fifth invention, a rising section is formed upward on the upper part of the main frame, the cover body is formed into an inverted L shape by a side plate section and an upper plate section that is bent at a right angle inwardly from the upper portion of the side plate section, the side plate section is fixed to the main frame side in a state of outward abutment against the rising section, and the uppermost surface and tilted upper surface are formed by the upper plate section.

With the second implementation mode, fixing the side plate section to the rising section makes it possible to position the uppermost surface in the upper plate section at the same level as the upper surface of the article support body and to position the cover body so that the tilted upper surface of the inner end is in a low position lowered with respect to the upper surface of the article support body.

In the third preferred implementation mode of the changeover system of the fifth invention, an upward facing receiving surface positioned outside the rising section is formed at the upper part of the main frame, and the cover body is fixed to the main frame side in a state where the side plate section abuts against the rising section from outside and the lower end of the side plate section abuts against the receiving surface.

With the third implementation mode, fixing the side plate section to the rising section makes it possible to position the uppermost surface in the upper plate section at the same level as the upper surface of the article support body and to position the cover body so that the tilted upper surface of the inner end is in a low position lowered with respect to the upper surface of the article support body. Furthermore, such mutual arrangement can be constantly maintained by causing the lower end of the side plate section to abut from above to the receiving surface.

In the fourth preferred implementation mode of the changeover system of the fifth invention, the cover body is formed into an inverted L shape by a side plate section and an upper plate section that is bent at a right angle inwardly from the upper portion of the side plate section, the uppermost surface and tilted upper surface are formed by the upper plate section, and a concave section is formed on the inner surface side of a corner section formed by the side plate section and upper plate section.

With the fourth implementation mode, if a large impact is created when the article supplied from the article support body side comes into contact with the uppermost surface, the upper plate section can bend via the concave section, thereby relaxing the impact.

In the fifth preferred implementation mode of the changeover system of the fifth invention, a branch path of the main conveying path is provided outwardly at the side of the main frame, and the branch conveying surface of the branch path is positioned at the same level as the uppermost surface of the cover body.

With the fifth implementation mode, the article supplied from the article support body side can be smoothly moved from the uppermost surface to the branch conveying surface, without shaking in the vertical direction. As a result, damage of the article and the occurrence of noise can be prevented.

In order to attain the above-described sixth advantage, the sixth invention provides a changeover system comprising a pair of left and right endless rotary bodies installed along a main conveying path and a multiplicity of article support bodies attached between the endless rotary bodies and having the direction perpendicular to the main conveying path as a lengthwise direction, wherein side brackets are provided at both ends of the article support body, guided members that are supported and guided by the main frame are provided at the side of the side brackets, endless rotary bodies positioned on the outside of the guided members are configured to be capable of coupling and separating by the movement in the lengthwise direction, a rising section is formed upward at the upper part of the main frame, a guide rail section is formed on the inside of the rising section, the upward facing support surface of the guide rail section is positioned at the same level or slightly below the upper end of the rising section and configured to support and guide the guided members, the guided members comprise rotary bodies that can rotate about a central axis extending in the lengthwise direction, and the upper end of the rising section is positioned below this central axis.

With the above-described configuration of the sixth invention, moving a group of article support bodies on the main conveying path by the movement of both endless rotary bodies makes it possible to convey the articles supplied onto the group of article support bodies of the leading end section on the main conveying path and by moving the article transverse pushing body in the lengthwise direction of the article support body makes it possible to push the article sidewise and deliver it outwardly to the side of the main conveying path. In this process, the article support body can be moved in a stable state by moving the endless rotary bodies so that they are supported and guided by the upward facing support surface via the rotating bodies. Furthermore, because the prescribed locations of the endless rotary bodies are moved (deflected) outwardly, those prescribed locations can be moved outwardly above the rising section. Then, after the endless rotary bodies and side brackets were positioned opposite each other, the endless rotary bodies are moved in the lengthwise direction with respect to the side brackets, thereby making it possible to join the endless rotary bodies with side brackets. As a result, both ends of the article support body can be linked to the endless rotary bodies via the respective side brackets. At this time, the movement (linking) of the endless rotary bodies from the outside can be conducted rapidly in an easy manner and with good operability. Furthermore, the movement (linking release) of the endless rotary bodies to the outside can be similarly conducted rapidly in an easy manner and with good operability.

In the first preferred implementation mode of the changeover system of the sixth invention, a cover body for covering the endless rotary bodies from above is detachably configured with respect to the rising section.

With the first implementation mode, the cover body can be attached and detached easily.

In the second preferred implementation mode of the changeover system of the sixth invention, the article support body is attached between the endless rotary bodies via the side brackets provided at both ends thereof, the guide rail section is formed in the upper section of the main frame, the upward facing support surface and inward sidewise guide surface are formed in the guide rail section, and a guided member that is supported and guided by the upward facing support surface and a secondary guided member that is guided by the sidewise guide surface are provided at the side of the side brackets.

With the second implementation mode, the group of article support bodies can be moved by the movement of endless rotary bodies in a stable state because the group can be supported and guided by the upward facing support surface of the guide rail section via the guided members and can be guided by the sidewise guide surface via the guided members.

In the third preferred implementation mode of the changeover system of the sixth invention, the upper end of the rising section is positioned below the lower surface of the endless rotary body.

With the third implementation mode, the movement (linking) of the endless rotary bodies from the outside and the movement (linking release) of the endless rotary bodies to the outside can be conducted rapidly in an easy manner and with good operability, without interfering with the rising section.

In the fourth preferred implementation mode of the changeover system of the sixth invention, the endless rotary body is an endless chain.

With the fourth implementation mode, the articles supplied onto the groups of the article support bodies of the leading-end section can be conveyed on the main conveying path by moving the groups of the article support bodies on the main conveying path by the movement of the endless chains.

In order to attain the above-described seventh advantage, the seventh invention provides a changeover system comprising a pair of left and right endless rotary bodies installed along a main conveying path and a multiplicity of article support bodies attached between the endless rotary bodies and having the direction perpendicular to the main conveying path as a lengthwise direction, wherein the main frame comprising frame members disposed as a pair at the top and bottom, respectively, on both sides and a middle frame member linking the upper-lower and left-right frame members, a homeward guide rail section protruding inwardly, and an upper end extending section positioned above the homeward guide rail member are formed integrally in the lower frame member, an upward facing support surface is formed in the homeward guide rail section, a sidewise guide surface is formed inwardly in the upper end extending section, an article transverse pushing body fitted over the article support body and guided thereby in the lengthwise direction is provided at the article support body, and a guided member supported and guided by the upward facing support surface and a secondary guided member guided by the sidewise guide surface are provided at the side of the article support body.

With the above-described configuration of the seventh invention, moving a group of article support bodies on the main conveying path by the movement of both endless rotary bodies makes it possible to convey the articles supplied onto the group of article support bodies of the leading end section on the main conveying path and by moving the article transverse pushing body in the lengthwise direction of the article support body makes it possible to push the article sidewise and deliver it outwardly to the side of the main conveying path. In this process, the movement of the article support bodies in the return path can be always conducted in a stable state because they are supported and guided by the upward facing support surface of the guide rail sections at the side of both homeward paths via the guided members and also guided by the sidewise guide surface of the guide rail sections at the side of both homeward paths via the secondary guided members.

In the first preferred implementation mode of the changeover system of the seventh invention, the sidewise guide surface of the upper end extending surface is positioned on the inner side from the inner surface of the homeward guide rail section.

With the first implementation mode, at the homeward side, the guided member can be prevented from being lifted and, therefore, the group of the article support bodies can be moved in a stable state without shaking in the vertical direction because the upper end extending section is positioned above the guided member.

DETAILED DESCRIPTION OF PREFERRED EMBODIMENTS

Figure 1:
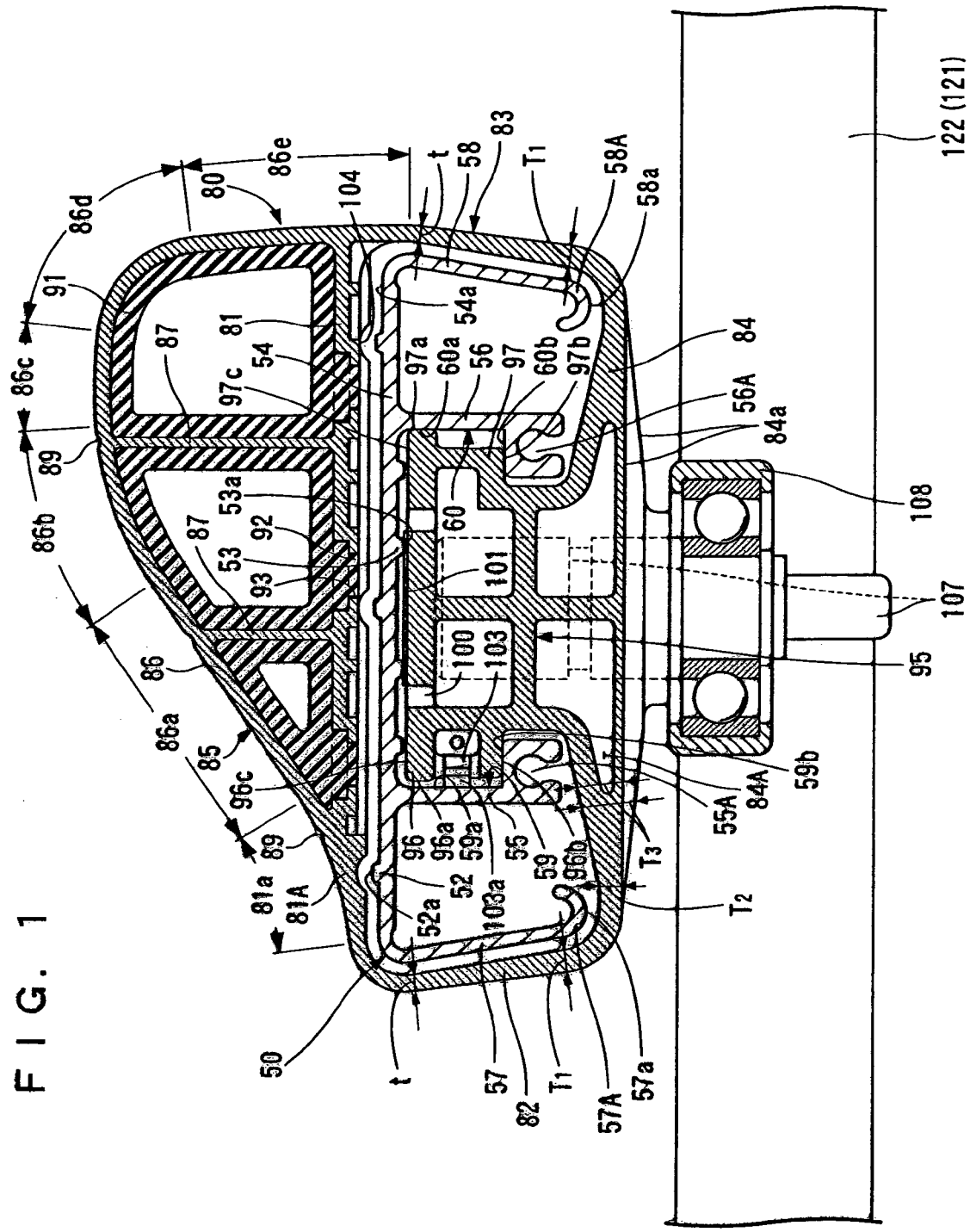
FIG. 1 is a side view with a longitudinal section of an article support body portion having attached thereto an article transverse pushing body in the changeover system, illustrating the first embodiment of the present invention.

The first embodiment of the present invention will be described based on FIG. 1 to FIG. 20.

In FIG. 2 to FIG. 4, FIG. 7, FIG. 16, and FIG. 17, the reference numeral 1 stands for a main frame, comprising frame members 10, 20 disposed as a pair at the top and bottom, respectively, on both sides, a middle frame member 2 linking the upper-lower and left-right frame members 10, 20, and a group of leg bodies 3 installed consecutively below the lower frame members 20. The middle frame member 2 comprises a longitudinal link member 4 and a transverse link member 5.

The upper frame member 10 is formed from an aluminum molded product so as to have a rectangular cross section, a rising section 11 that rises upward is formed in the central portion thereof, a notch-shaped step 12 is formed on the outside above the rising section 11, an upward receiving surface 11a is formed above the rising section 11 at the side of the step 12, and an upward groove-like lubricating oil receiving section 13 is formed on the inner side above the rising section 11. Furthermore, in the upper frame member 10, an outward dovetail groove 14 is formed in a position above the receiving surface 11a in the rising section 11, an upward dovetail groove 15 is formed in a position of the outer step 12, and an inner downward dovetail groove 16 and outer downward dovetail groove 17 are formed in the lower end. Moreover, in the upper frame member 10, an outward guide rail section 18 protrudes from a position slightly below the inner lubricating oil receiving section 13 inwardly, and this outward guide rail section 18 serves to support and guide the article support body (described herein below).

Here, an upward support surface 18a is formed by the upper surface of the outward guide rail section 18, an inward sidewise guide surface 18b is formed by the inner surface, and a tilted control surface 18c is formed to rise from the upward support surface 18a toward the lubricating oil receiving section 13. A downward dovetail groove 19 is formed in part of the outward guide rail section 18. The lubricating oil receiving section 13, dovetail grooves 14 to 17, 19, and outward guide rail section 18 are formed along the entire length in the lengthwise direction during molding of the upper frame member 10. At this time, the upper end 11b of the rising section 11 is provided at a height necessary to form the lubricating oil receiving section 13. As a result, the upward support surface 18a of the outward guide rail section 18 assumes a position slightly below (position at the same height or slightly below) the upper end 11b of the rising section 11.

An example of the upper frame member 10 is constituted by the above-described components 11 to 19.

The lower frame member 20 is formed from an aluminum molded product so as to have a rectangular cross section, an inner upward dovetail groove 21 and outer upward dovetail groove 22 are formed in the upper end thereof, and an inner downward dovetail groove 23 and an outer downward dovetail groove 24 are formed in the lower end thereof. Furthermore, an upward groove-like lubricating oil receiving section 25 is formed on the inner side of the middle section of the lower frame 20, a homeward guide rail section 26 protrudes inwardly, and this homeward guide rail section 26 serves to support and guide the article support body.

Here, an upward support surface 26a is formed by the upper surface of the homeward guide rail section 26, and a tilted control surface 26c is formed to rise from the upward support surface 26a toward the lubricating oil receiving section 25. Furthermore, a downward dovetail groove 27 is formed in part of the homeward guide rail section 26. An upper end extension section 29 is formed integrally so as to be positioned above a step 28 formed, e.g., by the homeward guide rail section 26. As a result, the sidewise inner surface 29a is formed by the inner surface of the upper end extension section 29. At this time, a sidewise guide surface 29a is positioned on the inner side at the prescribed length L from the inner surface 26c of the homeward guide rail section 26. Those dovetail grooves 21 to 24, 27, homeward guide rail section 26, and upper end extension section 29 are formed along the entire length in the lengthwise direction during molding of the lower frame 20. An example of the lower frame member 20 is constituted by the above-described components 21 to 29.

In the middle frame member 2, plate-like nut bodies 6 are positioned in both downward dovetail grooves 16, 17 of the upper frame member 10, and the middle frame member 2 is integrated with the upper frame member 10 by screwing and fastening a bolt body 7 that passes from below the longitudinal link member 4 or transverse link member 5 of the middle frame member 2 with a nut body 6. Furthermore, the middle frame member is integrated with the lower frame member 20 with the nut body 6 and bolt body 7 in the same manner as described above by using both upward dovetail grooves 21, 22 of the lower frame member 20. A plurality of such middle frame members 2 are installed with the prescribed spacing in the lengthwise direction of the two frame members 10, 20. Furthermore, the leg bodies 3 are linked to the lower frame member 20 with the nut body 6 and bolt body 7 by using the downward dovetail grooves 23, 24 of the lower frame member 20.

An idle shaft 30 extending in the left-right direction is rotatably installed in the leading end section of the main frame 1 of the above-described configuration, and a drive shaft 31 extending in the left-right direction is rotatably installed in the trailing end section. The idle shaft 30 and drive shaft 31 are rotatably supported via respective bearing devices 33 on the pair of left and right support members 32 installed between the two frame members 10, 20. A drive device 34 operably linked to the drive shaft 31 comprises an electric motor 35 and a reduction gear 36 integrated therewith, and the output section of the reduction gear 36 is operably linked to the drive shaft 31.

An endless chain (example of endless rotary body) 40 is installed via sprockets (examples of wheels) 38, 39 between the mutually opposing sections at both ends of the idle shaft 30 and drive shaft 31. Here, the sprockets 38, 39 are installed on the inner side of the support member 32 and linked to the idle shaft 30 and drive shaft 31. The endless chain 40 comprises links 41 and link pins 42. Here, the endless chain 40 is positioned above the lubricating oil receiving section 13 on the outward side and inside the step 28 above the lubricating oil receiving section 25 on the homeward side. A multiplicity of article support bodies 50 are mounted between the left and right endless chains 40.

In this case, sections protruding from the sides of the endless chains 40, that is, long link pins (examples of protruding sections) 43 formed by causing the link pins disposed with the prescribed pitch, among the aforementioned link pins 42, to protrude inside are used to attach the article support bodies 50, and annular outward concave sections 44 are formed in the distal ends of protruding portions of the long link pins 43.

The article support bodies 50 are installed, as shown in FIG. 1 to FIG. 9, FIG. 16, and FIG. 17, so that the direction perpendicular to the main conveying path 45 serving as a movement direction of both endless chains 40, serves as a lengthwise direction 51. The article support body 50 is composed, as a shaped rail with an open lower surface side, of a flat article-carry plate section 54, leg plate sections 55, 56 installed consecutively as a pair from the middle section of the lower surface (middle portion of the rear surface) of the article carry plate section 54 in the direction of the main conveying path 45 and extending in the lengthwise direction 51, a front plate section 57 extending downward and rearward from the front end of the article carry plate section 54, a front circular arc section 57A facing rearward from the lower end of the front plate section 57, a rear plate section 58 extending downward and forward from the rear end of the article carry plate section 54, and a rear circular arc section 58A facing forward from the rear end of the rear plate section 58. Further, in the flat article-carry plate section 54, three (a plurality of) upward facing convex sections 52 extending along the lengthwise direction 51 are formed in the direction of the main conveying path 45 in the upper surface (face surface) 54a, and four (a plurality of) downward facing convex sections 53 extending along the lengthwise direction 51 are formed in the direction of the main conveying path 45 in the middle portion of the lower surface (rear surface).

In such a configuration, the upper portions of the group of the upward facing convex section 52 are formed at the flat surface 52a, and the lower portions of the group of the downward facing convex sections 53 positioned between the two leg plate sections 55, 56 are formed at the flat surface 53a. The lower ends of the two leg plate sections 55, 56 are formed as thick section by protruding to the mutually opposite sides (inside). As a result, groove-like guide sections 59, 60 opened to the mutually opposite sides are formed between the two leg plate sections 55, 56 and also within a middle section of the lower surface of the article carry plate section 54. In the guide sections 59, 60, front-back guide surfaces 59a, 60a are formed by the mutually opposing surfaces, and the lower guide surfaces 59b, 60b are formed by the upward facing surfaces of the thick sections. The upper guide surface is formed by the flat surfaces 53a of the group of the convex sections 53 serving as the downward facing surfaces of the article carry plate section 54.

Furthermore, the front plate section 57 and rear plate section 58 have an inwardly tilted shape, such that they gradually approach each other by the mutually opposing sides as they extend downward. The front circular arc section 57A and rear circular arc section 58A have a semi cylindrical shape and are positioned below the lower ends of both leg plate sections 55, 56. The lower surfaces (outer surfaces) thereof are formed as downward circular arc surfaces 57a, 58a. Thus forming the front circular arc section 57A and rear circular arc section 58A at the lower ends of the front plate section 57 and rear plate section 58 makes it possible to form the lower ends of those front plate section 57 and rear plate section 58 so as to prevent them from being caught on other components and to ensure a sufficient strength. Furthermore, positioning the front circular arc section 57A and rear circular arc section 58A below the lower ends of both leg plate sections 55, 56 makes it possible to protect the guide sections 59, 60 and prevent damage. Furthermore, groove-like threaded sections 55A, 56A opened downward are formed in the lower end of the two leg plate sections 55, 56. The above-described components 52 to 60 constitute an example of the article support body 50. With such an article support body 50 configured to have a shaped rail form opened on the lower surface, the entire body can be formed to have a small weight and can be provided at a low cost.

Respective side brackets 61 are attached, for example, by insertion joining, at both ends in the lengthwise direction 51 of the article support body 50 of the above-described configuration. The side brackets 61 are made from iron and, as shown in FIG. 4 to FIG. 8 and FIG. 15, plate-like insertion sections 63 protruding inward are provided in two, front and rear, locations on the upper part of the inner surface side of a main body section 62 that has a large length in the direction of the main conveying path 45. A through hole 64 is formed between the insertion sections 63. An inward protruding piece 62A is formed by bending in the lower part of the middle of the main body section 62. Furthermore, a tubular body 65 protruding outwardly is attached by inserting a small-diameter portion of the inner end thereof and welding to one location in the front section on the outer surface side of the side bracket 61. Furthermore, a concave engaging section 66 opened on both the inner side and the outer side and also outwardly is formed by bending and displacing through the corresponding length in the rear section.

A tubular linking section 67 is internally fitted in the tubular body 65, and an insertion hole 68 in the lengthwise direction 51 is formed by the inner peripheral surface of this tubular linking section 67. Thus, in the tubular linking section 67, a collar section 67A is formed at the outer end thereof, and the portion for forming the inner end side of the insertion hole 68 in the tubular linking section 67 is split circumferentially in four (multiple) sections, thereby forming tongue sections 67B. An inward facing convex section 67C is formed at the inner end of each tongue section 67B, and an outward facing convex section 67D is formed slightly on the outside thereof. Here, the tubular linking section 67 is formed integrally from a resin. An annular groove 65A that can be elastically engaged with the outward facing convex section 67D is formed on the inner surface side on the tubular body 65.

The side brackets 61 that were thus formed can be attached at both ends of the article support body 50 by inserting a pair of insertion sections 63 into a pair, front and rear, of hollow sections formed by the article carry plate section 54 and the front plate section 57 or rear plate section 58 in the article support body 50 and then screwing the bolt body 69 that was passed from the outside into the through hole 64 into the threaded section 55A or 56A. The linking section 67 can be then linked with the tubular body 65 in the internal fitting mode by inserting the tubular linking section 67 from outside and fitting inside the tubular body 65, abutting the collar section 67A of the tubular linking section against the outer end surface of the tubular body 65, and elastically engaging the outward facing convex sections 67D of the group of tongue sections 67B with the annular groove 65A.

The two ends of the article support body 50 can be then linked to the endless chains 40 via the respective side brackets 61 and the multiplicity of article support bodies 50 can thereby be mounted between a pair, left and right, endless chains 40 by inserting the protruding portions of the long link pins 43, which protrude from the sides of the endless chains 40, from the outside into the insertion holes 68 of the tubular link body 67, elastically engaging the inward convex sections 67C of the group of tongue sections 67B with the outward concave sections 44 and joining the long link pins 43 with the tubular link body 67. At this time, a ring body 75 made from a resin is externally fitted over the tubular body 65 of the side bracket 61, and the engaging section 66 in the adjacent side bracket 61 is externally fitted over the ring body 75. Thus, the engaging surfaces of the engaging section 66 and the ring body 75 on the side of the tubular linking section 67 are made from different materials, that is, from iron and resin.

Rotary bodies (an example of guided members, each comprising a bearing system or a roller system) 70 with an outer peripheral section made from polyurethane are fitted externally over the tubular body 65, and those rotary bodies 70 are supported and guided by the upward support surfaces 18a, 26a of both guide rail sections 18, 26 on the side of the main frame 1. Furthermore, side rollers (an example of guided members) 71 with an outer peripheral section made from polyurethane are rotatably provided via a longitudinal shaft 72 at the protruding pieces 62A, and those side rollers 71 are guided by the sidewise guide surface 18b of the guide rail section 18 on the side of the main frame 1.

Thus, when the rotary bodies 70 are supported and guided by the guide rail section 18 on the outward side, the endless chain 40 is positioned above the lubricating oil receiving section 13. In this case, because the upward support surface 18a of the guide rail section 18 is configured to be positioned slightly below the upper end 11b of the rising section 11 in order to support and guide the rolling bodies 70, the upper end 11b is positioned below the axial center (center of the rotary body 70) 43A of the link provided by the long link pin 43 and also below the lower surface 40a of the endless chain (endless rotatable body) 40. As a result, the lower surface 40a of the endless chain 40 can be positioned above the upper end 11b of the rising section 11, thereby making it possible to move (deflect) the endless chain 40 in the lengthwise direction 51 and to conduct the insertion from the outside of the long link pins 43 in an easy manner, rapidly, and without interference with the rising section 11.

An article transverse pushing body 80 that is free to move in the lengthwise direction 51 when externally fitted over and guided by the article support body 50 is provided at each article support body 50. Each transverse pushing body 80 comprises a lower rectangular tubular portion and an upper transverse pushing action section 85. Thus, as shown in FIG. 1 to FIG. 14, in each transverse pushing body 80, the rectangular tubular portion is formed by a flat upper plate member 81 facing the article carry plate section 54 from above, a front plate member 82 facing the front plate section 57 from the outside by extending downward and rearward from the front end of the upper plate member 81, a rear plate member 83 facing the rear plate section 58 from the outside by extending downward and forward from the rear end of the upper plate member 81, and a flat bottom plate member 84 facing the front circular arc section 57A or rear circular arc section 58A from the lower side (below) by being positioned between the lower ends of the front plate member 82 and rear plate member 83.

The transverse pushing action section 85 is provided on the upper surface side (above) of the upper plate member 81. Thus, the transverse pushing action section 85 is formed by a top plate member 86 covering from above the remaining section (flat section) of the upper plate member 81 except the front end section 81A thereof, a pair (single pair or multiple pairs) of front and rear rib plate members 87 extending in the left-right direction and linking the top plate member 86 to the upper plate member 81, and a ring member 88 (single member or multiple members) extending in the front-rear direction in the center in the left-right direction. Here, the strength of the transverse pushing action section 85 is increased by the group of rib plate members 87, 88.

At this time, when the upper surfaces of the front end section 81A of the upper plate member 81 and the top plate member 86 are viewed from the side surface (upper surface shape), a portion of the front end section 81A is formed by the beak-like leading-end concave upper surface (an example of the leading-end upper surface) 81a, which is in the form of a convex circular arc and gradually rises with a small inclination, a front section of the top plate member 86 is formed by the tilted upper surface 86a, which has a linear shape and gradually rises at an inclination angle larger than that of the leading-end concave upper surface 81a, a middle portion of the top plate member 86 is formed by a front convex circular-arc upper surface 86b, which is in the form of a convex circular arc and gradually rises, and a rear convex circular-arc upper surface 86c, which is in the form of a convex circular arc and forms an apex, and the rear-end section of the top plate member 86 is formed by a corner surface 86d, which is in the form of a convex circular air and descends rapidly, and a convex circular-arc rear surface 86e, which is in the form of a convex circular arc and descends rapidly.

Thus, in the upper part of the transverse pushing action section 85, the middle portion in the front-rear direction is formed by the tilted upper surface 86a that is tilted forward and downward, and the leading-end concave circular-arc upper surface 81a is formed at a gradual angle with respect to the tilted upper surface 86a in the front end portion conjointly with the tilted upper surface 86a. Furthermore, the leading-end concave upper surface 81a, tilted upper surface 86a, front convex circular-arc upper surface 86b, rear convex circular-arc upper surface 86c, corner surface 86d, and convex circular-arc rear surface 86e are formed continuously in the order of description from the front to the back.

With such continuous forming, the entire structure is curved in a side view thereof and good external appearance can be attained. Furthermore, because the rear end portion of the top plate material 86 serves as a convex circular-arc corner surface 86d, for example, when the article transverse pushing body 80 in the reversal mode comes into contact with a belt etc. due, e.g., to erroneous operation in the case where conveying means (a belt conveyor apparatus or the like; not shown in the figure) for carrying in or out is installed in front of and behind the changeover system, the corner surface 86d comes into contact, thereby preventing the belt or the like from damage.

On the upper surface of the top plate member 86, a concave section 89 is formed along the entire length in the left-right direction in the boundary portion of the front end section 81a and top plate member 86 as well as in the position above the rib plate members 87 in the left-right direction. Therefore, for example, when the article transverse pushing body 80 is molded from a resin, the design capability can be improved by effectively using a group of concave sections 89 produced along the entire length in the portion of the group of the rib plate members 87 in the left-right direction.

Furthermore, when the front end section 81a of the upper plate member 81 and the top plate member 86 (transverse pushing action section 85) are in a plan view (side surface shape), a left-right corner of the front end section 81A is formed in the circular-arc side surface 81b in the form of a convex circular arc, and a concave circular-arc side surface 81c, which is in the form of a concave circular arc and descends rapidly, is formed conjointly with the rear end thereof. Both side surfaces of the top plate member 86 are formed by the sidewise tilted surfaces 86f that rise and have the end section thereof tilted toward the other side surface with respect to the front sections, so that the front end section joined to the concave circular-arc side surface 81c is wide, narrows gradually, and becomes a narrow rear end section. As a result, the top plate member 86 is formed, in a plan view thereof, to have a trapezoidal plate shape with an inclination angle θ of 30 degrees, and the group of rib plate members 87, 88 or portions obtained by removing the front end section 81a of the upper plate member 81 are formed so as to fit in the trapezoidal plate shape.

A transverse pushing abutment member 90 made from a rubber plate and having a transverse pushing abutment surface 90a of a concave-convex shape in the plan view thereof is detachably attached to the portion of the sidewise tilted surfaces 86f. Thus, the transverse pushing abutment member 90 has a shape covering the side surface from the transverse pushing action section 85 to the upper plate member 81, that is, the upper surface has a shape joined to the upper surface of the transverse pushing action section 85. Furthermore, in the attached state, the front end portion abuts against the concave circular-arc side surface 81c, and the convex side surface section (outer surface) in the transverse pushing abutment surface 90a of a concave-convex shape is formed to have a thickness suitable for joining to the rear end of the circular-arc side surface 81b.

Shaped tubular protruding sections 91 that can be inserted into the cavity sections of the transverse pushing action section 85 are formed integrally from three locations in the front-rear direction (a plurality of locations in the front-rear direction) at the inner surface side of the transverse pushing abutment member 90, and locking sections 92 are formed to protrude downward from the flat lower surface of those protruding sections 91. A group of engagement hole sections 93 that can be engaged with the group of the locking sections 92 are formed in the upper plate member 81. Here, the engagement hole sections 93 are formed in three locations in the front-rear direction (a plurality of locations in the front-rear direction) on the left side and in three locations in the front-rear direction (a plurality of locations in the front-rear direction) on the right side, so as to avoid the rib plate members 87 extending in the left-right direction, but the group of the engagement hole sections 93 of the left row and the group of the engagement hole sections 93 of the right row are formed with a displacement with respect to each other in the front-rear direction.

Therefore, when the protruding sections 91 are inserted into cavity sections of the transverse pushing action section 85 and the group of locking sections 92 is engaged with the group of engagement hole sections 93, the inner side surface of the transverse pushing abutment member 90 abuts against the sidewise tilted surfaces 86f, the convex side surface section of the transverse pushing abutment surface 90a assumes a state of joining to the rear end of the circular-arc side surface 81b, and the transverse pushing abutment surface 90a can be detachably attached to the transverse pushing action section 85 in a state where the rear section is tilted toward the other side surface at a tilting angle θ of 30 degrees with respect to the front section. At this time, because of the engagement of the group of the locking sections 92 with the group of engagement hole sections 93, the transverse pushing abutment member 90 is attached securely, and because the left row and right row are displaced with respect to each other in the front-rear direction, forming the transverse pushing abutment member 90 by resin molding can be easily conducted. An example of the transverse pushing action section 85 is constituted by the above-described components denoted by the reference numerals 86 to 93.

An upward protruding engagement section 95 that is fitted between the two leg plate sections 55, 56 are installed consecutively at the upper surface side of the bottom plate member 84, the upper half portions of the engagement section 95 protrude to the reciprocal sides (outwardly), thereby forming thick sections, and those thick sections mate with the guide sections 59, 60, forming guided sections 96, 97 that can be slidably guided. Thus, front and rear guiding surfaces 96a, 97a that can be slidably guided by the front and rear guide surfaces 59a, 60a are formed by the reciprocal surfaces (outer surfaces) at the upper end section of the guided sections 96, 97, the lower guiding surfaces 96b, 97b that can be slidably guided by the lower guide surfaces 59b, 60b are formed by the lower surface, and the upper guiding surfaces 96c, 97c that can be slidably guided from below by the flat surfaces 53a of the convex sections 53 are formed by the upper surfaces of the thick sections.

As a result, the article transverse pushing body 80 is configured to be joined with and guided by the guide sections 59, 60 in the article support body 50 via the front and rear guided sections 96, 97.

Here, in the plan view (upper surface shape), the upper plate member 81 of the article transverse pushing body 80 and top plate member 86 of the transverse pushing action section 85, as described above, are formed to have a trapezoidal shape that has a large width in the front end section and then gradually narrows to have a small width in the rear end section. The front plate member 82 is formed to have a wide rectangular plate shape that is somewhat narrower than that of the front end section of the upper plate member 81 due to a reduction caused by the circular-arc side surface 81b, the rear plate member 83 is formed to have an inverted T shape by a narrow upper half section 83A joined to a narrow rear end section of the upper plate member 81 and a trapezoidal lower half section 83B that gradually expands to assume a width that is equal to a somewhat narrow width of the front plate member 82, and the bottom plate member 84 is formed to have a rectangular shape close to a square shape of a large width joined to the lower ends of the front plate member 82 and lower plate member 83.

Thus, the rectangular bottom plate member 84 has a shape protruding on both sides in the lengthwise direction 51 with respect to the trapezoidal upper plate member 81 or top plate member 86. As a result, the width of the section facing the downward circular-arc surface 57a of the front circular-arc section 57A or the downward circular-arc surface 58a of the rear circular-arc section 58A can be increased.

Further, the engagement section 95, in a plan view thereof, has a rectangular shape with a long side in the lengthwise direction 51, and the front guided section 96 is set to the same width as the bottom plate member 84. Furthermore, the rear guided section 97 is set to a width larger than that of the bottom plate member 84, and stopping sections 99 are formed by the resultant protruding portions. The stopping sections 99 are so configured that a limit for the movement in the lengthwise direction 51 is established by the stopping sections 99 coming into contact with the inner side surfaces of the main body sections 62 in the side brackets 61. Further, the contact surface of the stopping section 99 is linear, but it may be a convex circular-arc surface protruding outwardly.

An upward facing elastic body capable of abutting from below against the article carry plate section 54 of the article support body 50 and a forward facing elastic body capable of abutting from inside against the front leg plate section 55 are provided at the article transverse pushing body 80 on the side of the guided sections 96, 97. Thus, upward tongue bodies (examples of the upward facing elastic body) 101 are formed via a pair of slits 100 in the direction 51 of the main conveying path 45 between the two guided sections 96, 97 in both end sections in the lengthwise direction in the engagement section 95, and those upward tongue bodies 101 are configured to be capable of deforming elastically in the up-down direction. Upward abutting sections 101a are formed at the free ends of both upward tongue bodies 101. Because the abutting sections 101a are formed to protrude upward from the upper surface of the engagement section 95, they are free to abut elastically from below against the article carry plate section 54.

Furthermore, forward tongue bodies (examples of the forward facing elastic body) 103 are formed via a pair of slits 102 in the up-down direction in both end portions in the lengthwise direction 51 in the front guided sections 96, and those forward tongue bodies 103 are configured to be capable of deforming elastically in the front-rear direction. Forward abutting sections 103a are formed at free ends of the forward tongue bodies 103. Because the abutting sections 103a are formed to protrude forward from the guiding surface 96a, they are free to abut elastically from inside against the leg plate sections 55.

In the article transverse pushing body 80, the upper plate member 81, front plate member 82, and rear plate member 83 are formed with uniform thickness in parts thereof. Thus, the front plate member 82 and rear plate member 83 are formed so that the thickness gradually increases toward the opposite side (central side) with the extension thereof downward with respect to the upper plate member 81.

In other words, as described above, the front plate section 57 and rear plate section 58 of the article support body 50 are tilted on the inside (narrowed on the inside) so as to come closer to each other with the extension thereof downward with respect to the article carry plate section 54. Therefore, by using the space produced by such configuration, the thickness $T_1$ of the lower end portion is formed larger than the thickness t of the upper end portion of the front plate member 82 and rear plate member 83. Furthermore, the thickness $T_2$ of the bottom plate member 84 is formed continuously with and larger than the thickness $T_1$ of the lower end portion of the front plate section 57 and rear plate section 58 and also formed so that the essential plate thickness $T_3$ increases gradually, sandwiching a hollow space 84A, as the plate extends from the portion connected to the lower ends of the front plate member 82 and rear plate member 83 to the central portion. In other words, the thicknesses satisfy the following conditions: $t < T_1 \approx T_2 < T_3$. Due to such variation of thicknesses, the strength of the entire article transverse pushing body 80 is raised without increasing the front-rear length (enlarging) of the article transverse pushing body 80.

In this case, the bottom plate member 84 is formed so that the central section thereof is a flat thick section and the peripheral sides are inclined sections with a thickness gradually increasing from the front-rear ends and left-right ends. However, the lower surface 84a thereof is formed to be flat as a whole, thereby eliminating interference with other articles. Furthermore, three concave groove sections 104 facing from above the convex sections 52 formed in the article carry plate section 54 or the article support body 50 are formed in the lower surface of the article transverse pushing body 80 on the side of the upper plate member 81. An example of the article transverse pushing body 80 is constituted by the above-described components 81 to 104. The article transverse pushing body 80 is molded integrally from a synthetic resin, with the exception of the transverse pushing abutment member 90.

A guiding body is attached to the lower side of the article transverse pushing body 80 by using the engagement section 95. Thus, a roller shaft (an example of the support shaft) 107 is provided in a vertical condition by supporting the upper part thereof by insert molding from the central portion of the engagement section 95, that is, from the central section between the guided sections 96, 97, and a guide roller (an example of the guided body) 108 is rotatably mounted on the protruding lower end of the roller shaft 107, thereby positioning the guide roller 108 outside the rear surface of the article transverse pushing body 80.

Thus supporting the upper portion of the roller shaft 107 by insert molding the central section between the guided sections 96, 97 makes it possible to position the support section of the roller shaft 107 between the two leg plate sections 55, 56, that is, above the circular arc sections 57A, 58A, which are the lower ends of the article support body 50, thereby enabling the arrangement of the guide roller 108 adjacently to the circular arc sections 57A, 58A and the decrease in the height of the article transverse pushing body 80 itself. Furthermore, the roller shaft 107 can be strongly supported between the guided sections 96, 97 that assume a sufficient height.

As shown in FIGS. 2, 3, 18, and 19, a forward guide device 110 for guiding the guide roller 108 is installed at the upper transverse link member 5 in the middle frame member 2 of the main frame 1, and a homeward guide device 116 is installed at the lower transverse link member 5. Furthermore, upper switching means 130 on the forward side and lower switching means 131 on the homeward side are installed in the central branching section, and a pair of left and right distribution means 132A, 132B are installed close to the leading end on the forward side.

The forward guide device 110 comprises a pair of left and right leading end guide sections 111A, 111B provided on both sides of a leading end section, a pair of left and right inner movement guide sections 112A, 112B that face the trailing ends of the leading end guide sections 111A, 111B via the distribution means 132A, 132B and are tilted inwardly toward the lower side thereof, a pair of left and right outer movement guide sections 113A, 113B that face the trailing ends of the inner movement guide sections 112A, 112B via the upper switching means 130 and are tilted outwardly toward the lower side thereof, and a pair of left and right trailing end guide sections 114A, 114B installed opposite the trailing ends of the outer movement guide sections 113A, 113B.

The homeward guide device 116 comprises a pair of left and right inner movement guide sections 117A, 117B that are tilted inwardly toward the lower side thereof and a pair of left and right outer movement guide sections 118A, 118B that face the trailing ends of the inner movement guide sections 117A, 117B via the lower switching means 131 and are tilted outwardly toward the lower side thereof.

The leading end guide sections 111A, 111B and trailing end guide sections 114A, 114B of the forward guide device 110 and the outer movement guide sections 118A, 118B of the homeward guide device 116 comprise a bracket 120 fixed to the upper transverse joining member 5, a guide body 121 so attached as to face the bracket 120, and a guide plate 122. The guide body 121 is an extrusion molded body of aluminum, the guide plate 122 is made from a resin, and the guide roller 108 is positioned between the opposing surfaces of the guide body 121 and guide plate 122.

Figure 16:
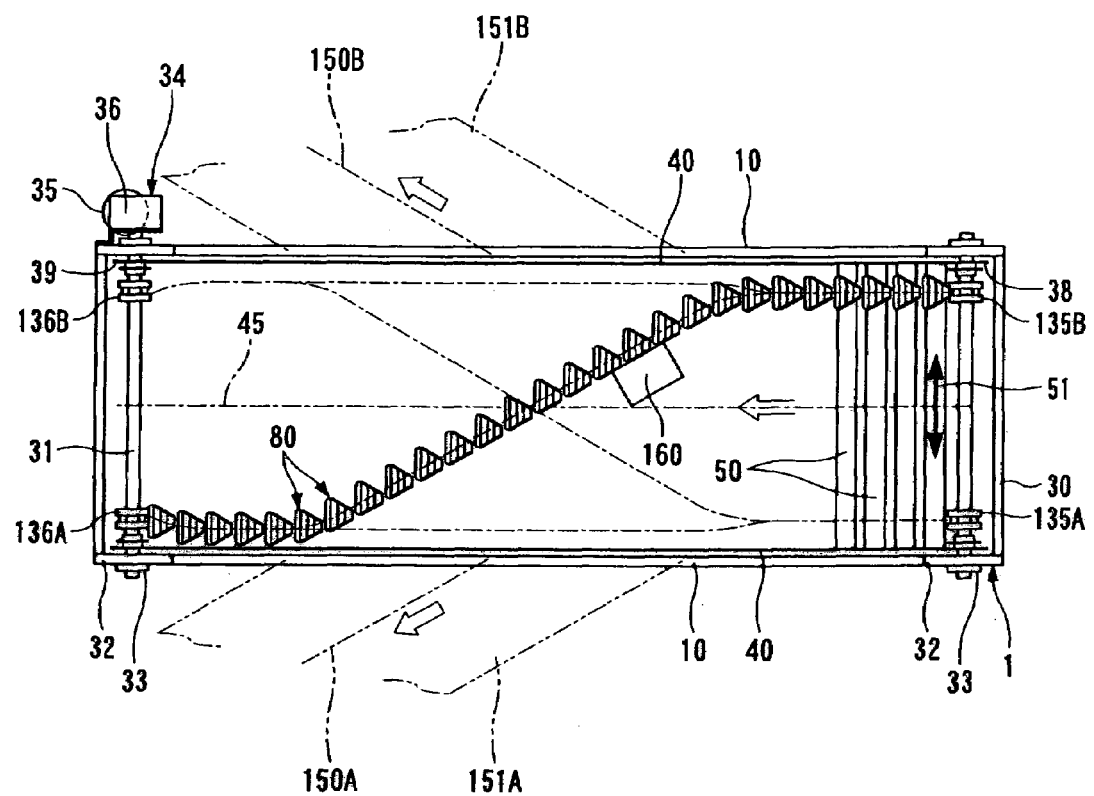
FIG. 16 is a schematic plan view of the changeover system.
Figure 17:
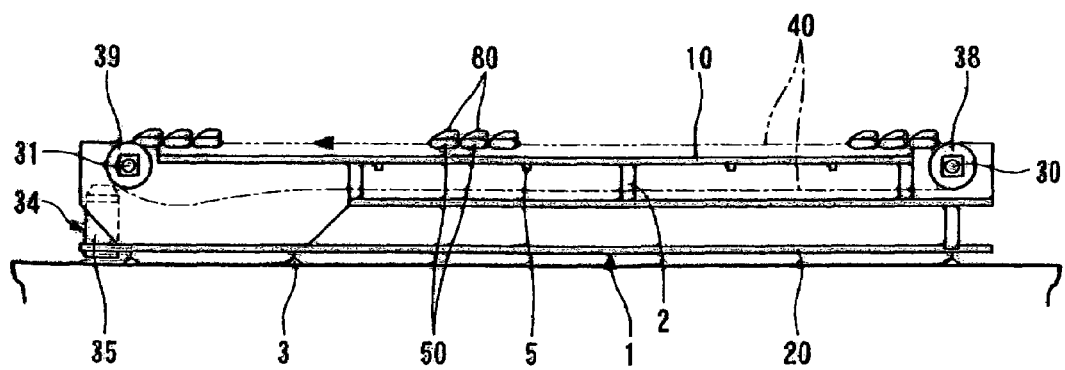
FIG. 17 is a schematic side view of the changeover system.
Figure 18:
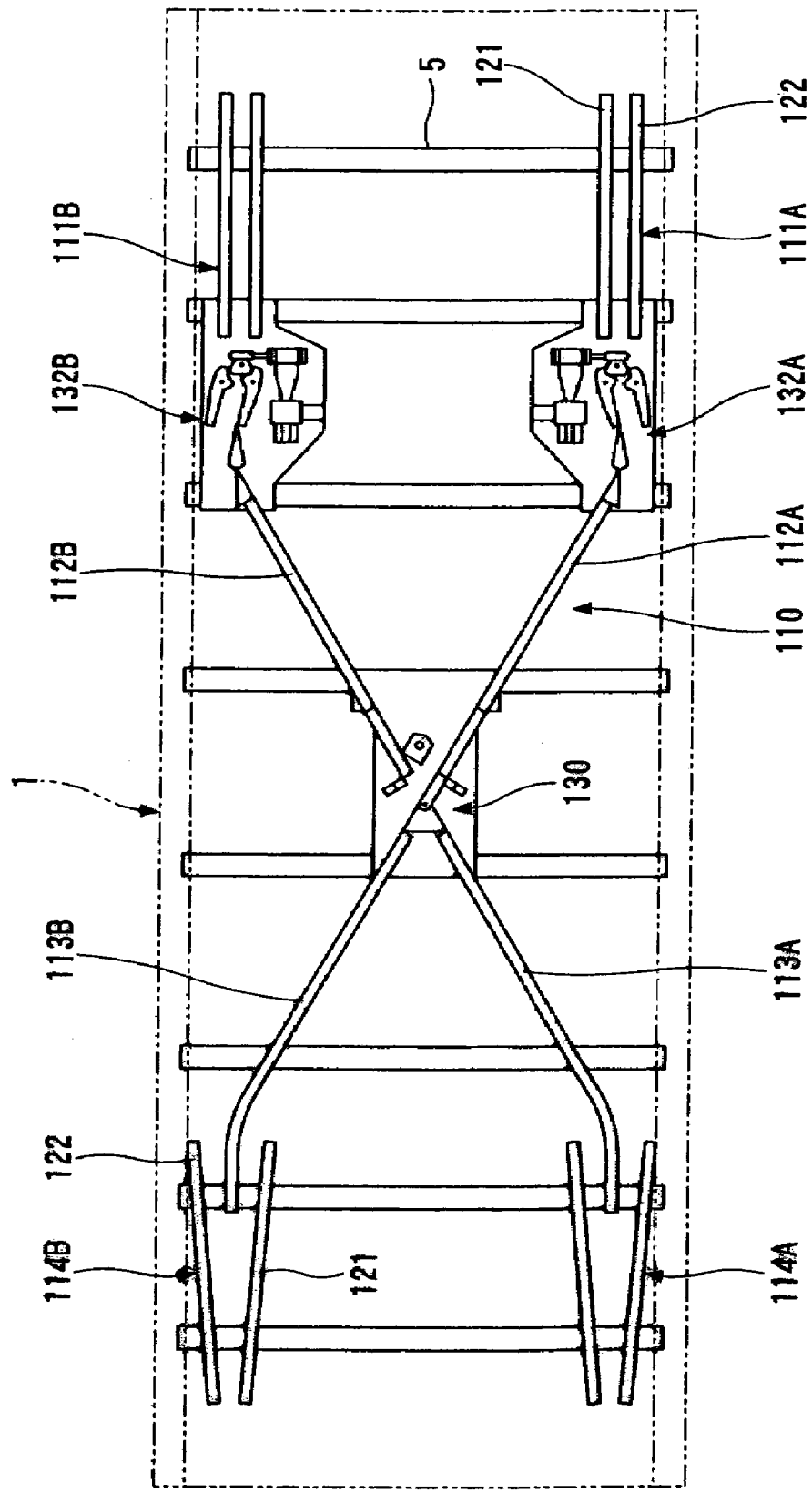
FIG. 18 is a schematic plan view illustrating a group of forward guide devices in the changeover system.
Figure 19:
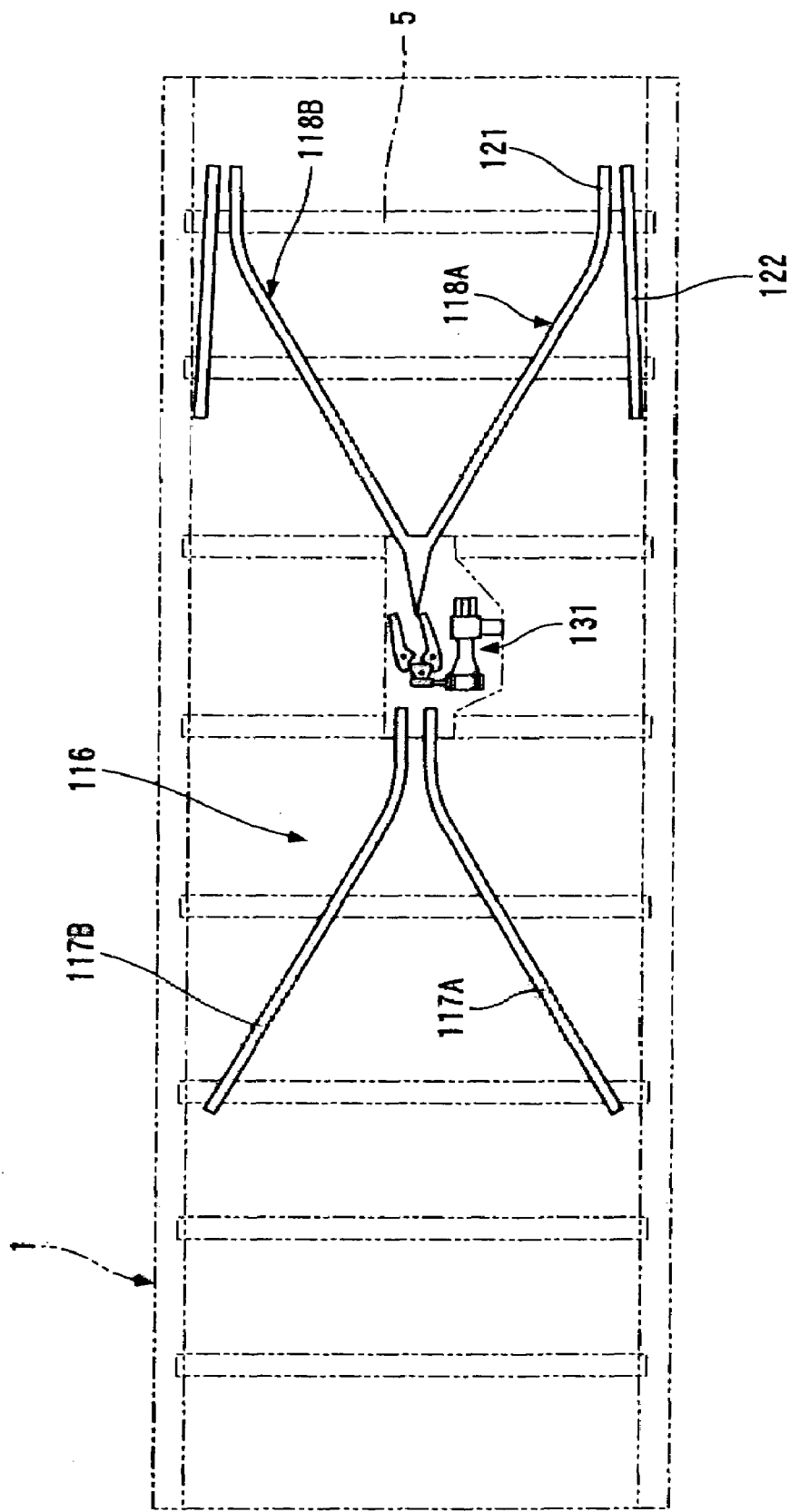
FIG. 19 is a schematic plan view illustrating a group of homeward guide devices in the changeover system.
Figure 20:
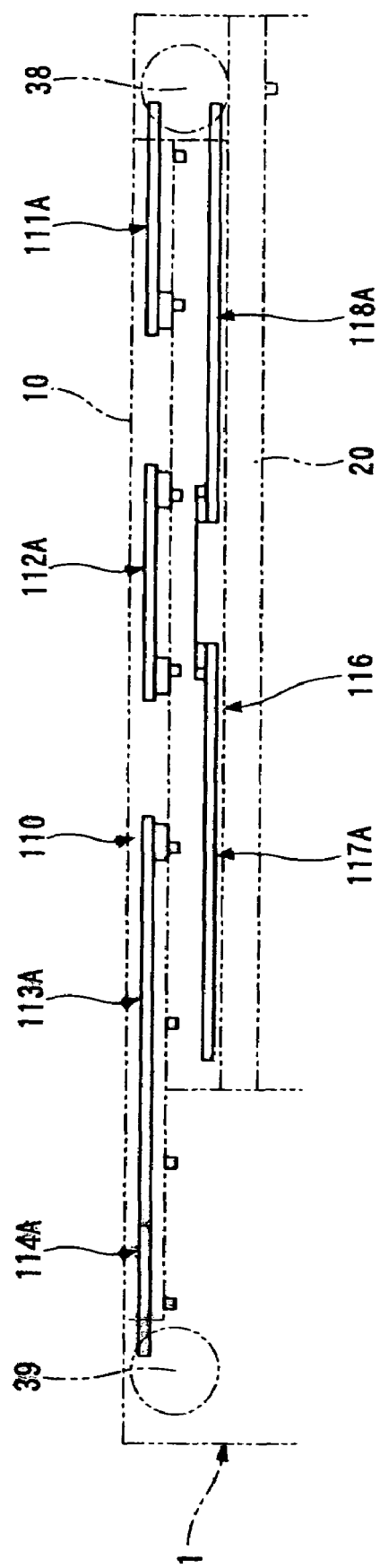
FIG. 20 is a schematic side view illustrating a group of guide devices in the changeover system.

Furthermore, the inner movement guide sections 112A, 112B or outer movement guide sections 113A, 113B of the forward guide device 110 and the inner movement guide sections 117A, 117B of the homeward guide device 116 are configured by fixing the guide body 121 directly to the lower transverse joining member 5, and the guide roller 108 is guided by the side surface of the guide body 121. As shown in FIG. 16, reverse guide bodies 135A, 135B, 136A, 136B that can be engaged with the guide roller 108 are attached to the sections of both shafts 30, 31 so that the guide roller 108 be guided by the leading reverse section.

Figure 2:
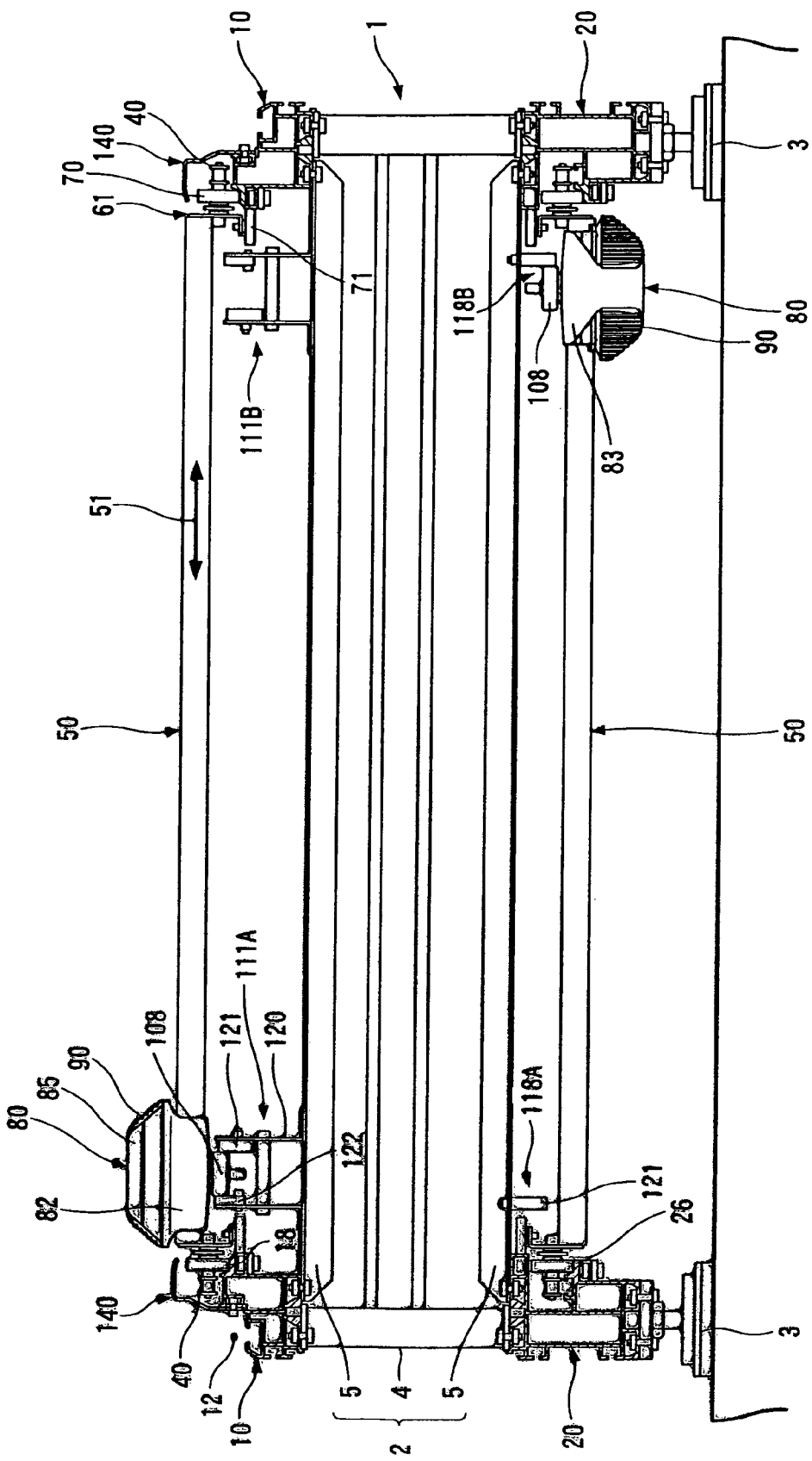
FIG. 2 is a partially cut-out front view of the changeover system.
Figure 3:
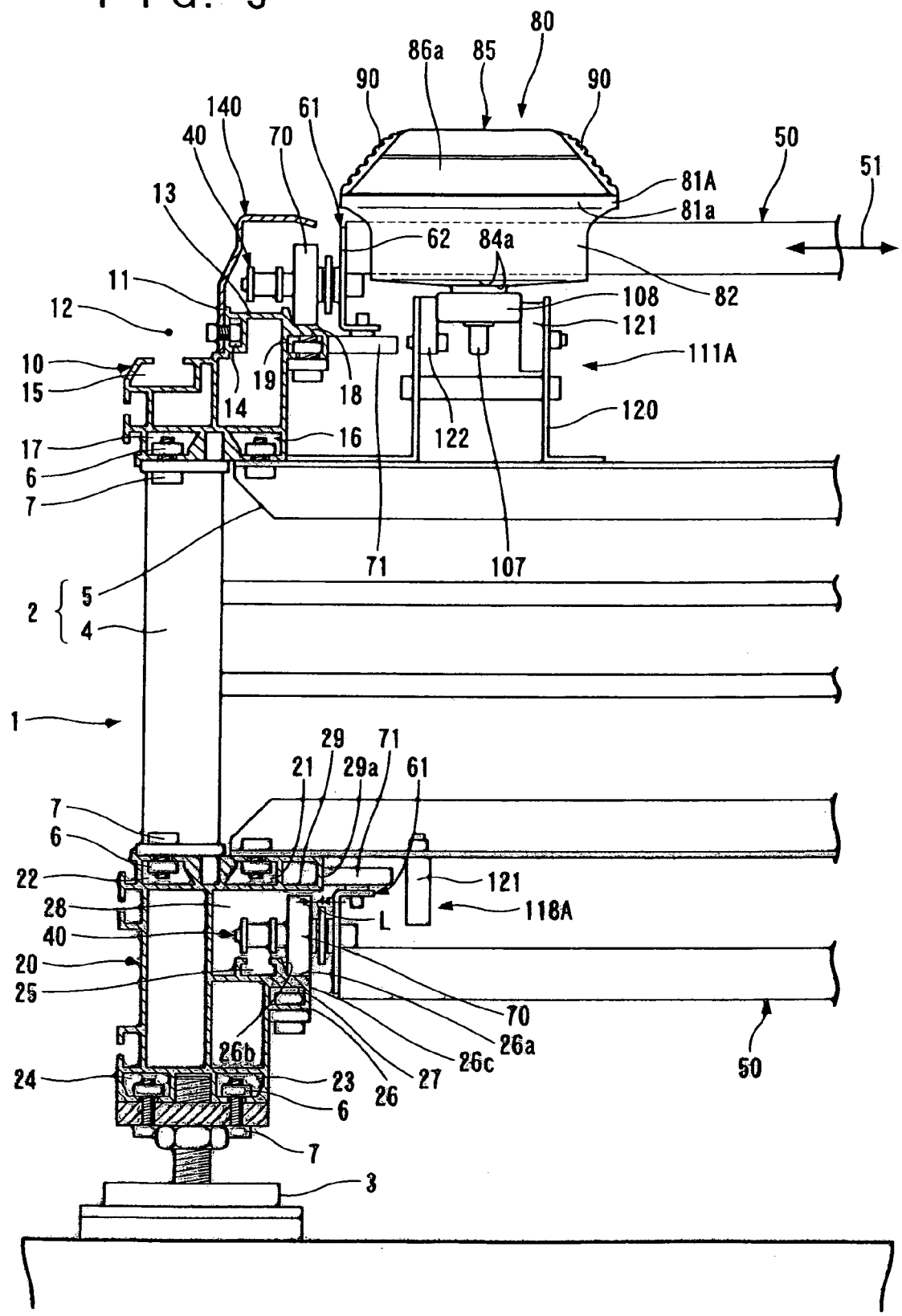
FIG. 3 is a partially cut-out front view illustrating the main portion of the changeover system.
Figure 4:
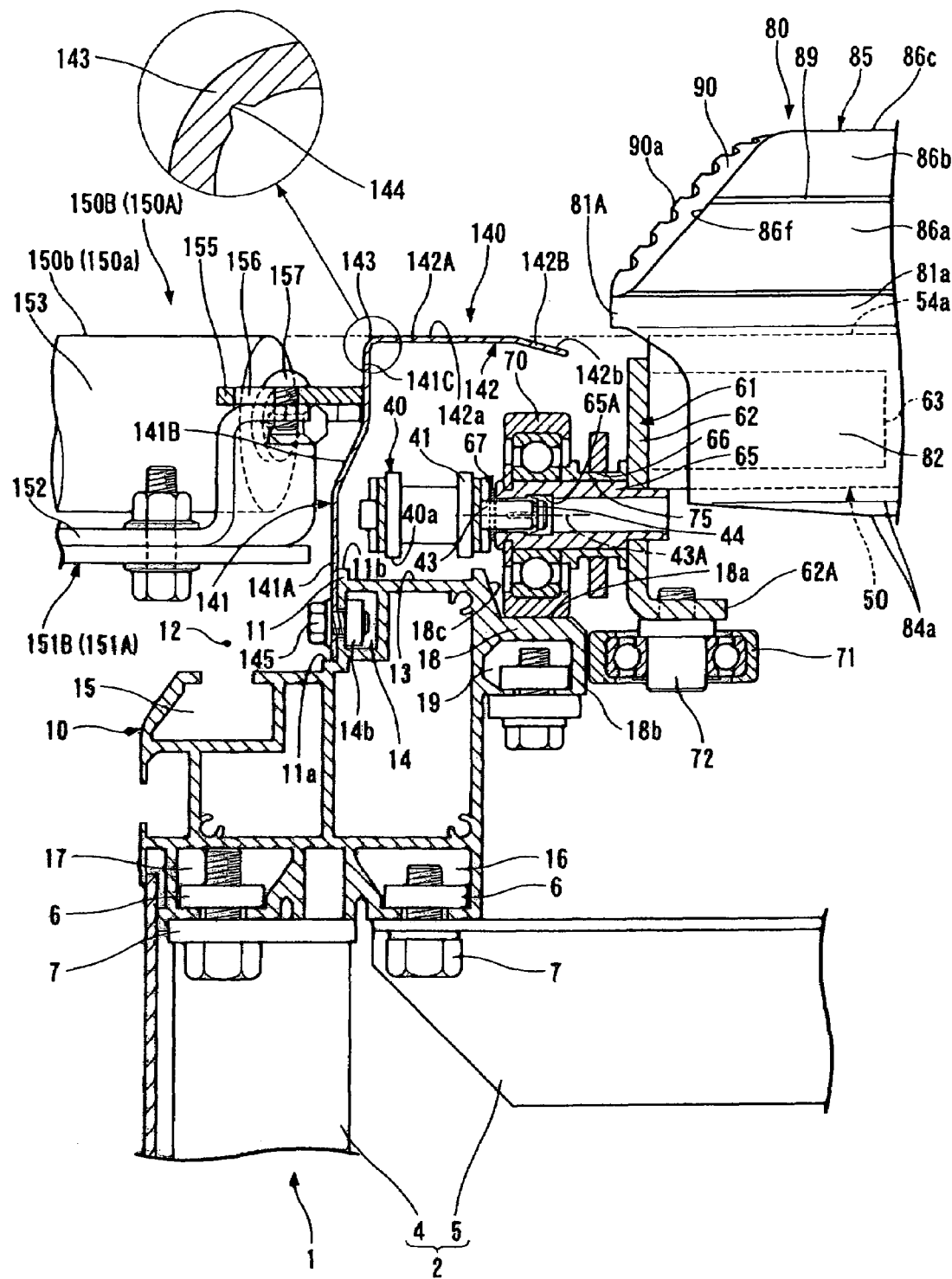
FIG. 4 is a front view of a longitudinal section of the upper frame member portion of the changeover system.

As shown in FIGS. 2 to 4, a cover body (chain cover) 140 for covering the endless chain 40 and rotary body 70 from above is disposed in a section where the endless chain 40 is installed and the outward guide rail section 18 is formed on the upper frame member 10 (upper part of the main frame 1). The cover body 140 is formed to have a rail shape in the form of inverted L in the cross section thereof by the side plate section 141 and an upper plate section 142 that is bent at a right angle inwardly from the upper portion of the side plate section 141. Here, the side plate section 141 comprises a lower rising plate section 141A, a middle tilted plate section 141B that is tilted inwardly as it rises, and an upper rising plate section 141C, and the upper plate section 142 comprises a horizontal transverse plate section 142A and an inner end tilted section 142B that is tilted downward as it extends inwardly. A concave section 144 is formed on the inner surface side of a corner section 143 formed by the side plate section 141 and upper plate section 142.

The cover body 140 can be detachably fixed to the rising section 11 of the upper frame member 10 by screwing a bolt body 145 that was passed from the outside to the lower end section of the lower rising plate section 141A into a nut body 146 positioned in advance inside the outward groove 14, after the lower rising plate section 141A has been abutted from the outside against the rising section 11 and the lower end of the lower rising plate section 141A has been abutted from above against the receiving surface 11a. At this time, the uppermost surface 142a of the transverse plate section 142A in the upper plate section 142 is at the same surface level as the upper surface 54a of the article carry plate section 54 and is slightly lower than the flat surface 52a. Furthermore, the tilted upper surface 142b of the inner end tilted section 142B is in a low position that is below the upper surface 54a of the article carry plate section 54.

Figure 6:
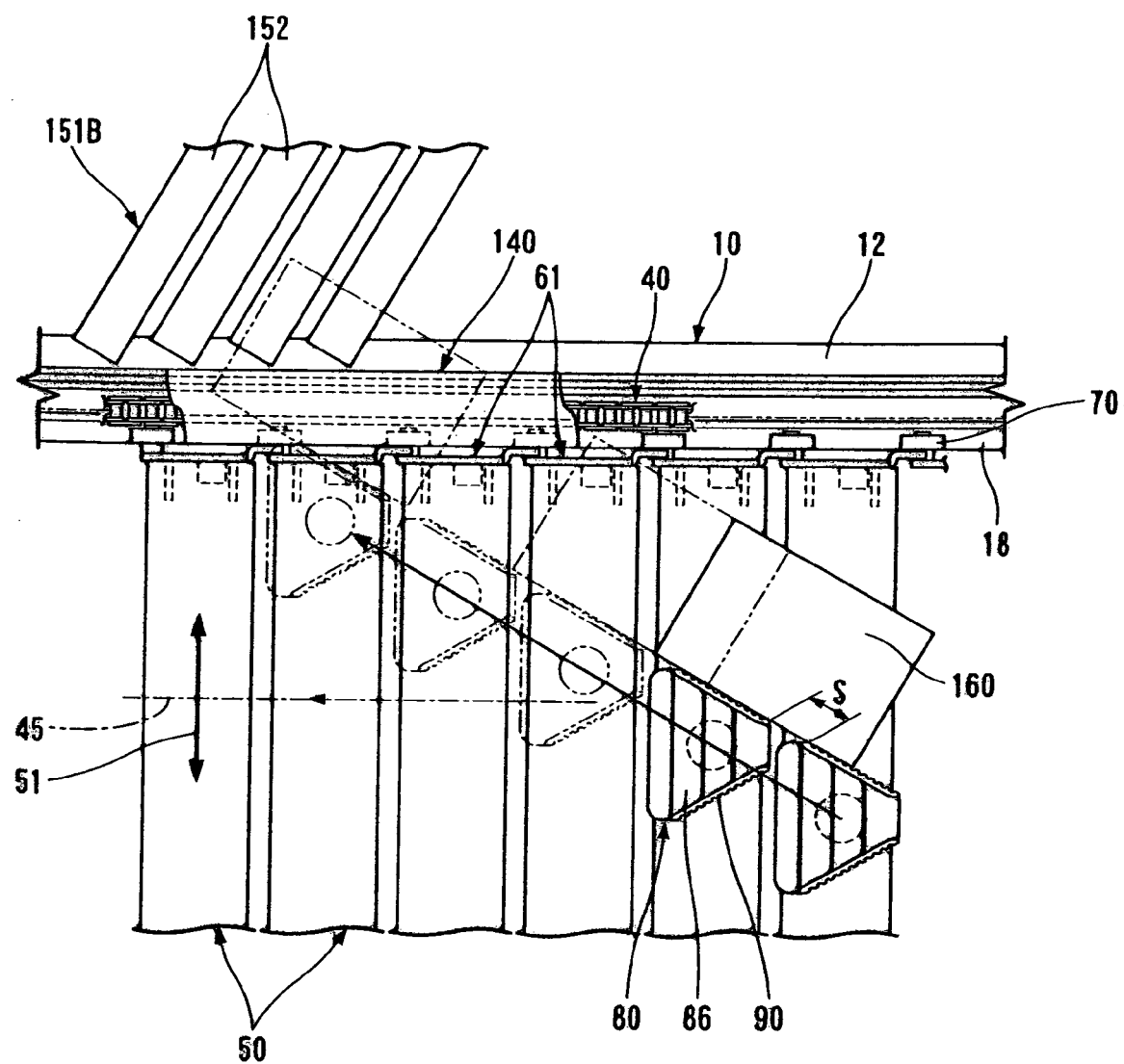
FIG. 6 is a plan view of the main section of the changeover system.
Figure 7:
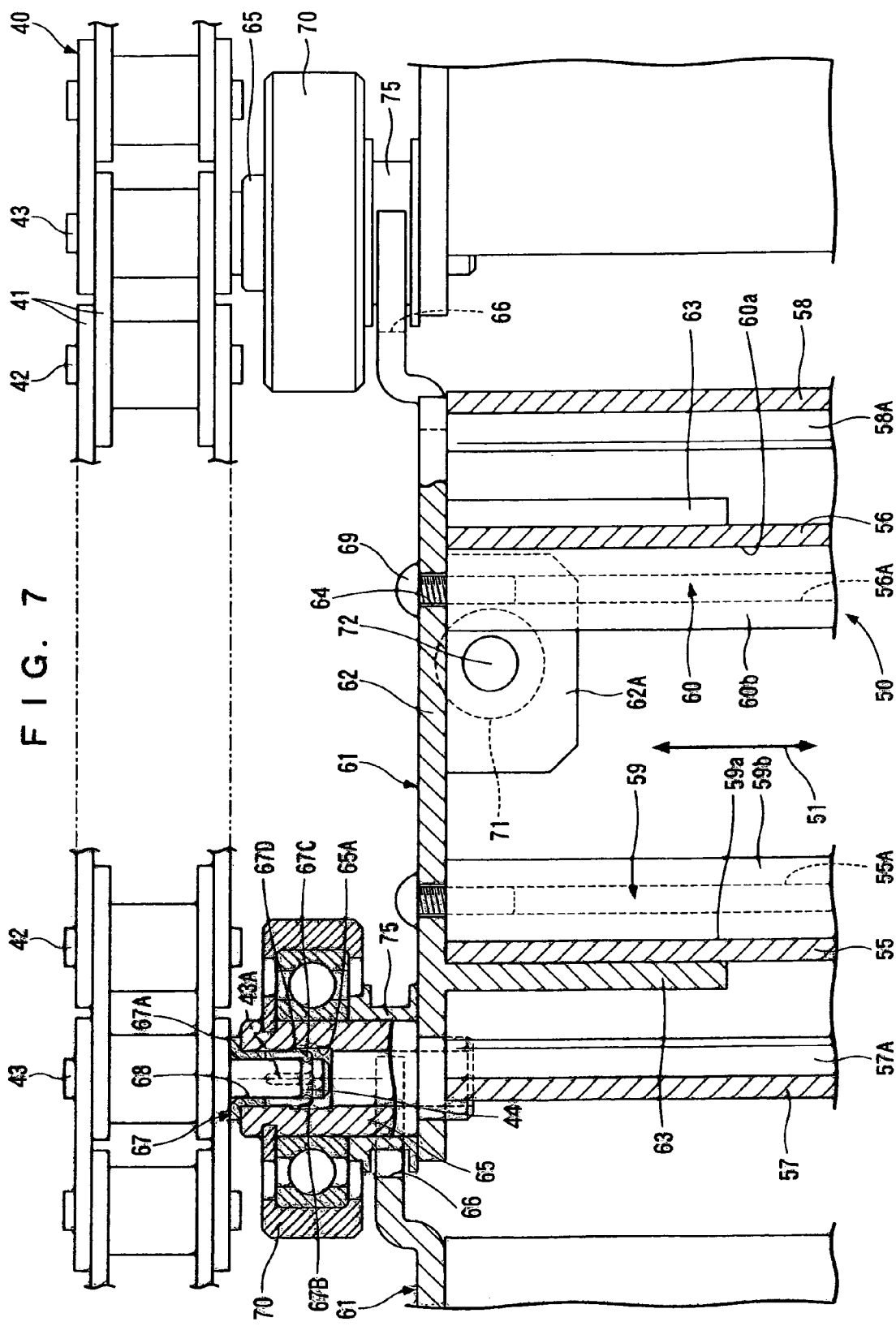
FIG. 7 is a partially cut-out plan view of the main portion, illustrating the linking state of the endless rotary body in the changeover system.
Figure 8:
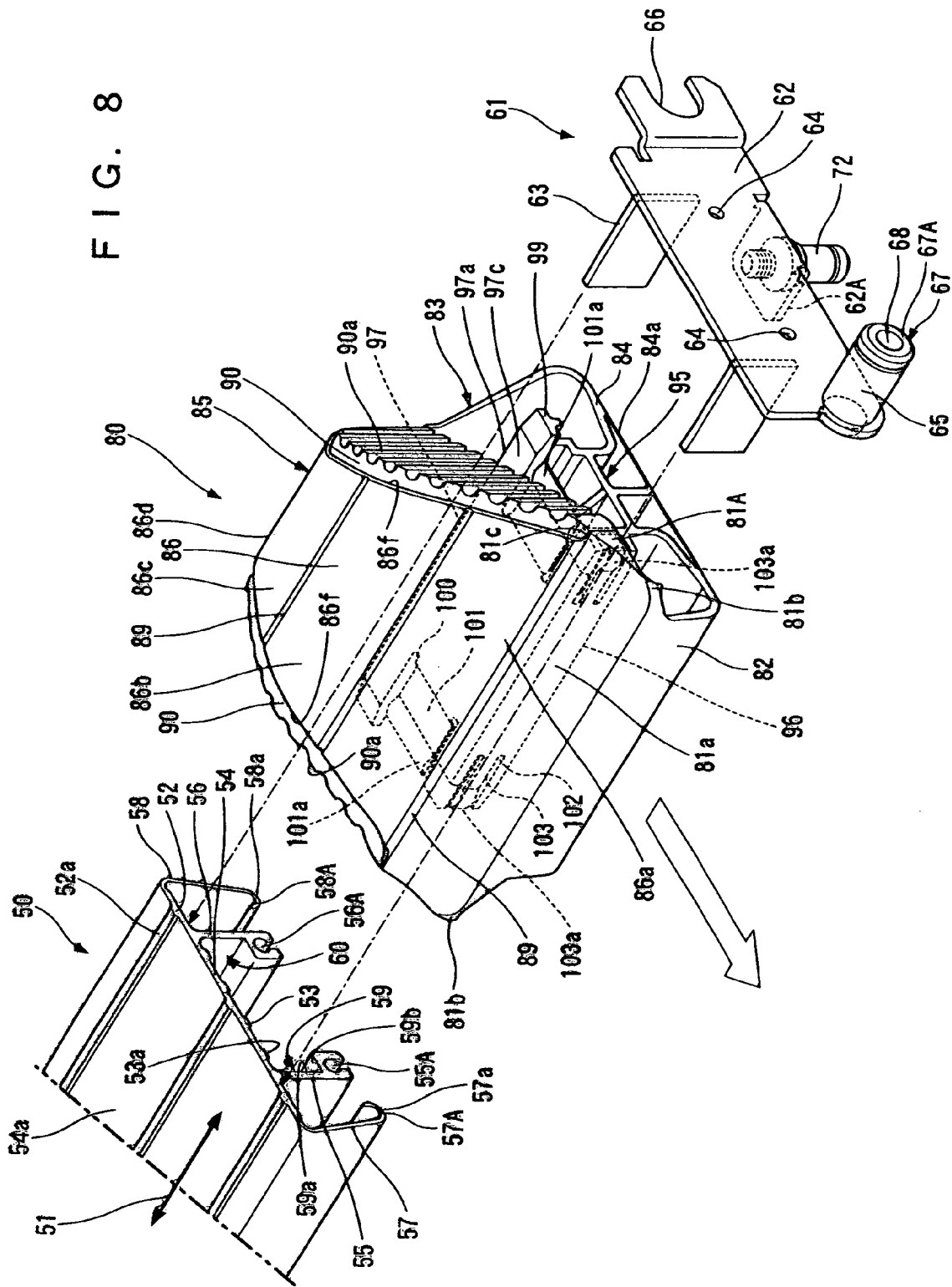
FIG. 8 is an exploded perspective view of the article support body, article transverse pushing body, and side brackets in the changeover system.
Figure 9:
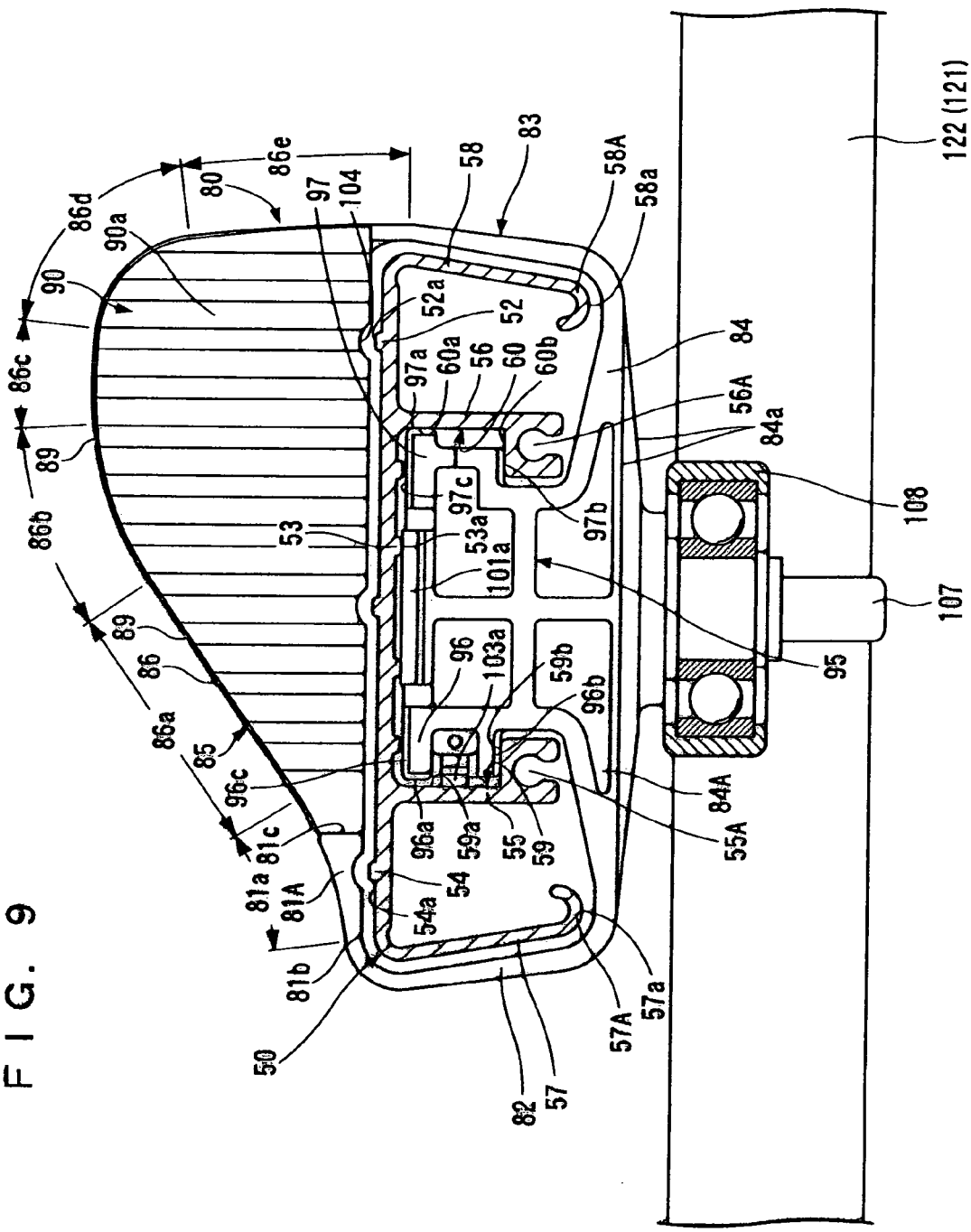
FIG. 9 is a partially cut-out side view of the article support body portion having attached thereto an article transverse pushing body in the changeover system.
Figure 10:
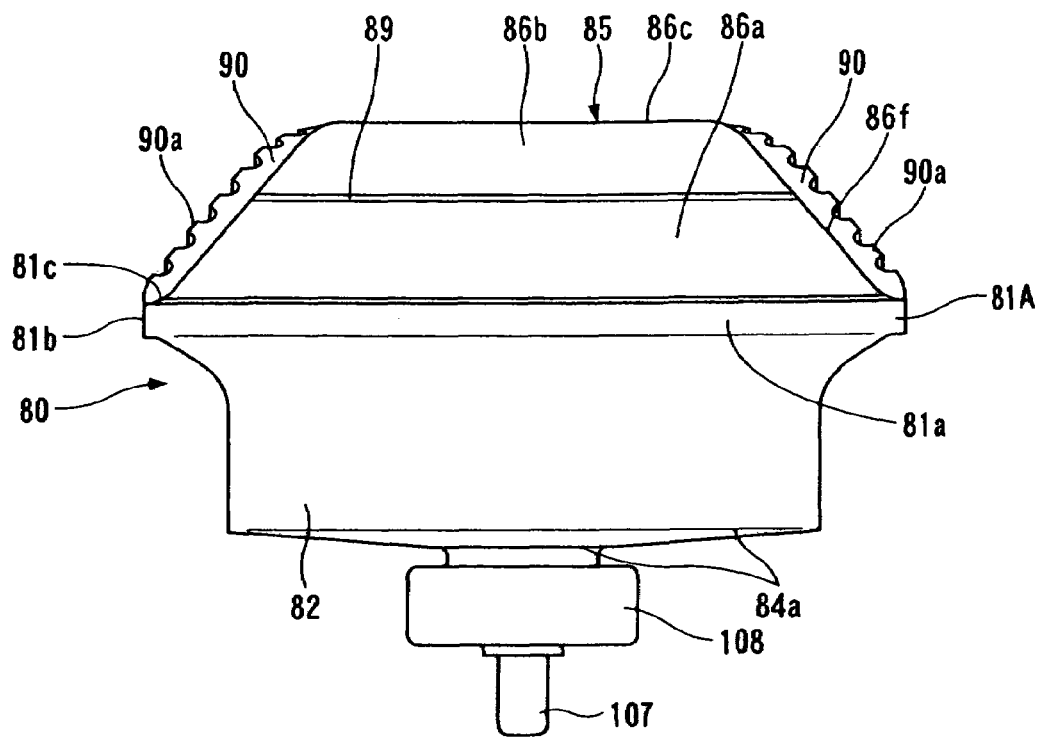
FIG. 10 is a front view of the article transverse pushing body in the changeover system.
Figure 11:
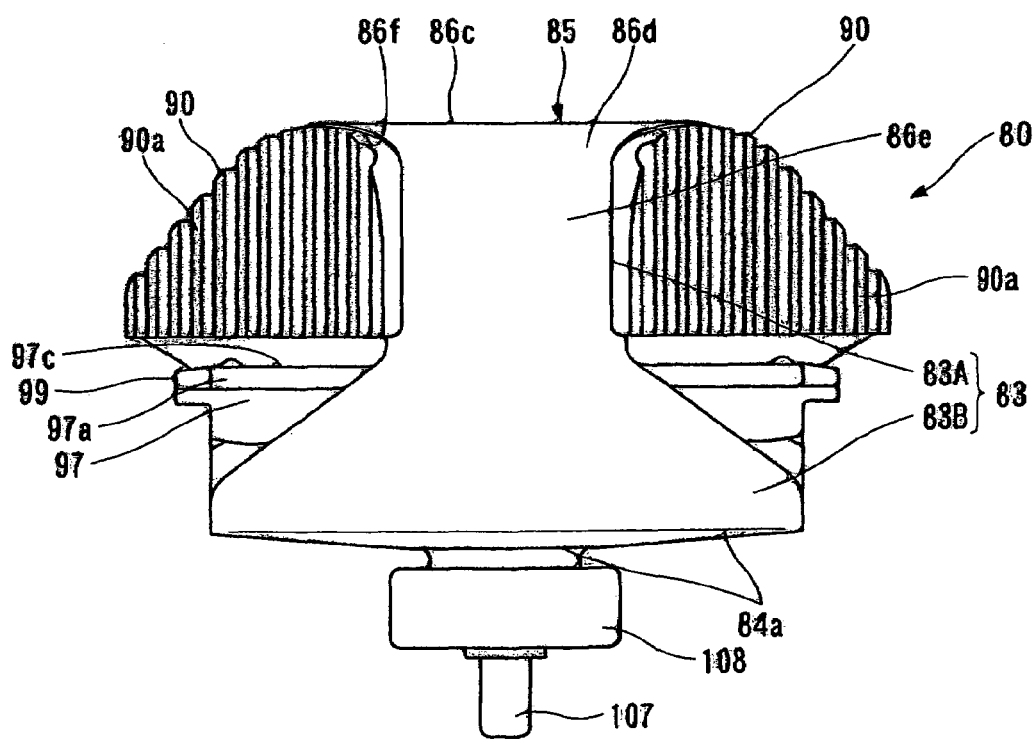
FIG. 11 is a back view of the article transverse pushing body in the changeover system.
Figure 12:
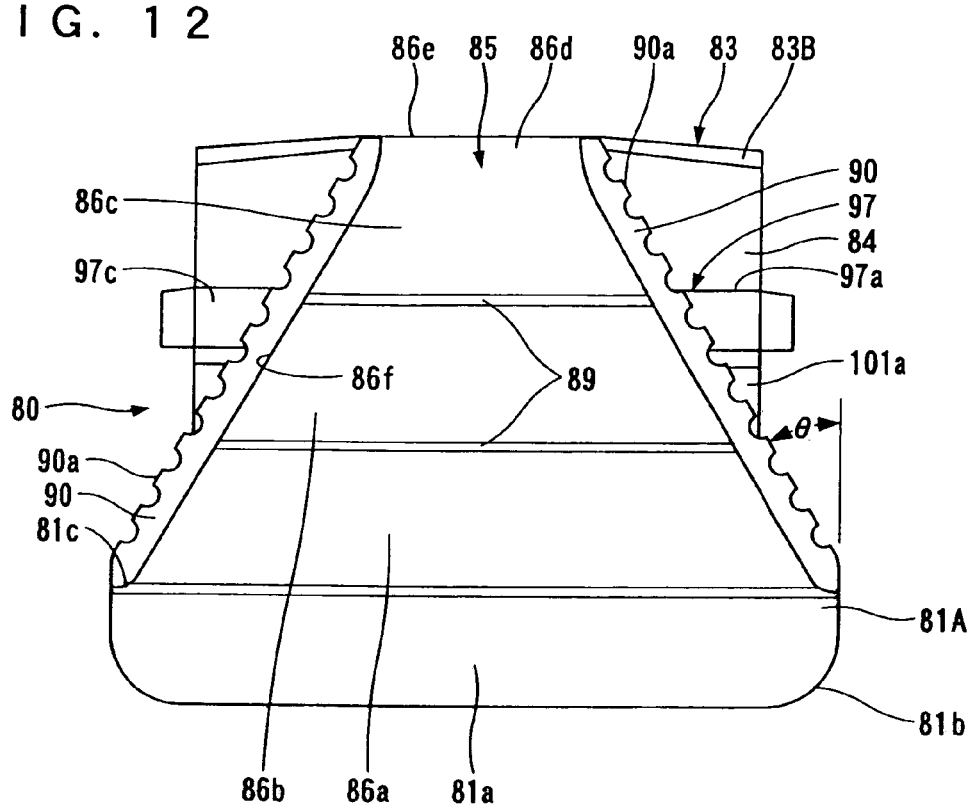
FIG. 12 is a plan view of the article transverse pushing body in the changeover system.
Figure 13:
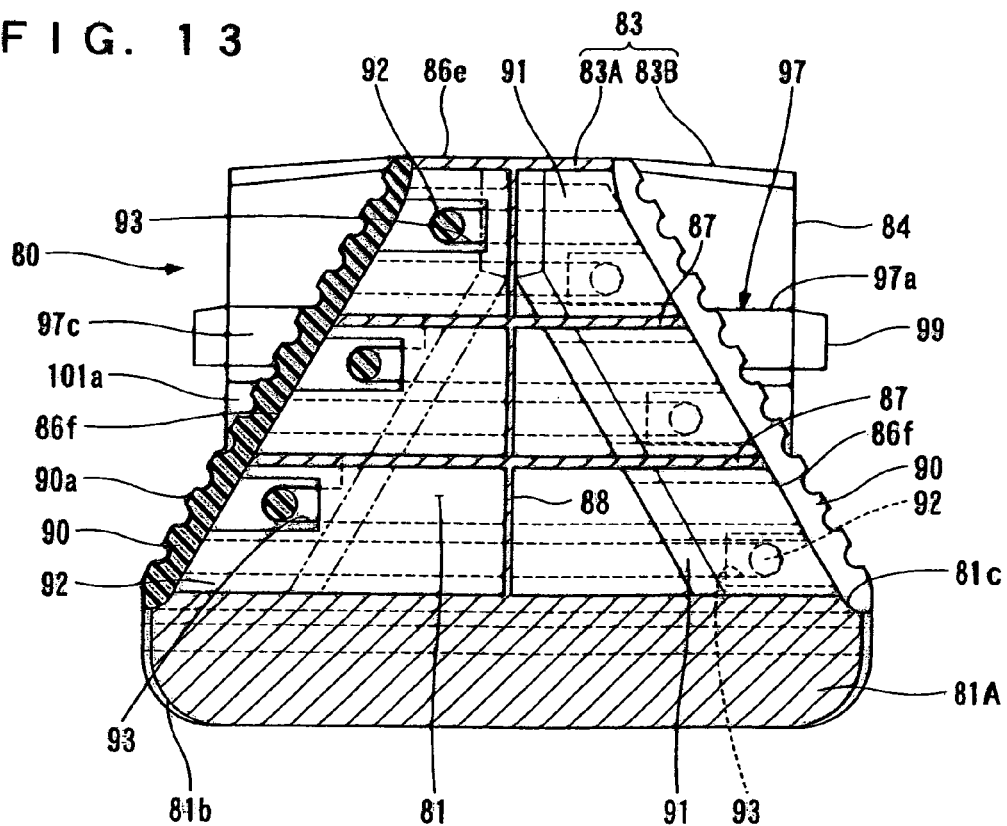
FIG. 13 is a partially cut-out plan view of the article transverse pushing body in the changeover system.
Figure 14:
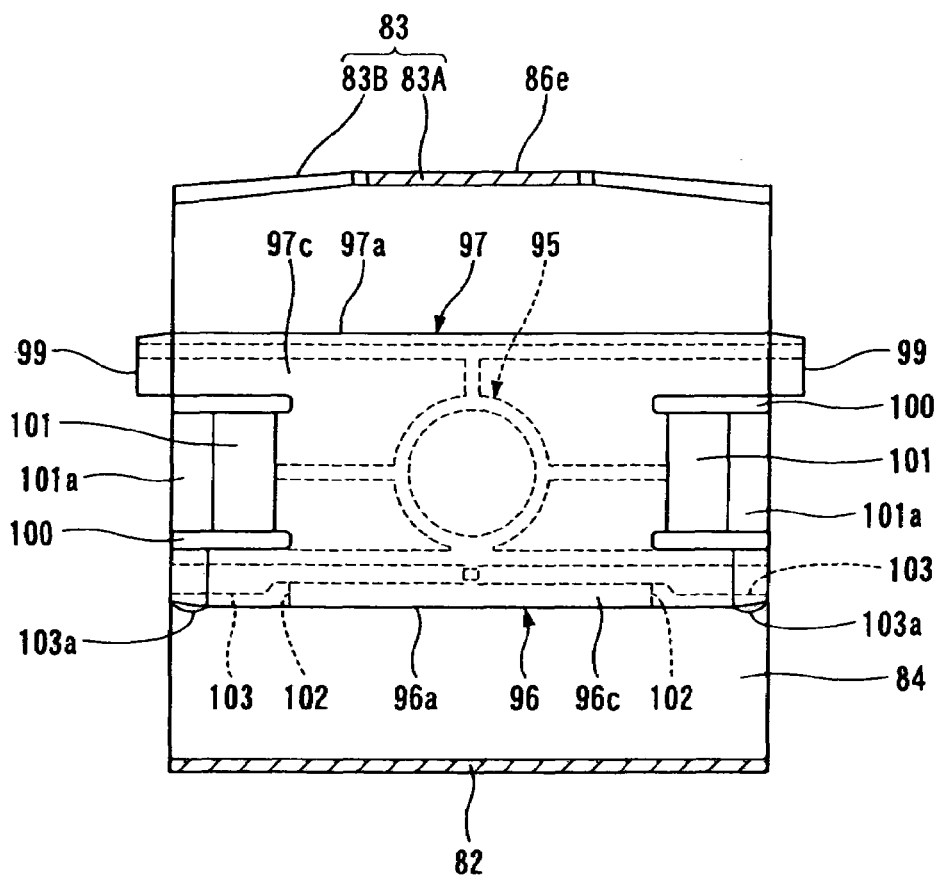
FIG. 14 is a transversely cut plan view illustrating an engagement section of the article transverse pushing body in the changeover system.
Figure 15:
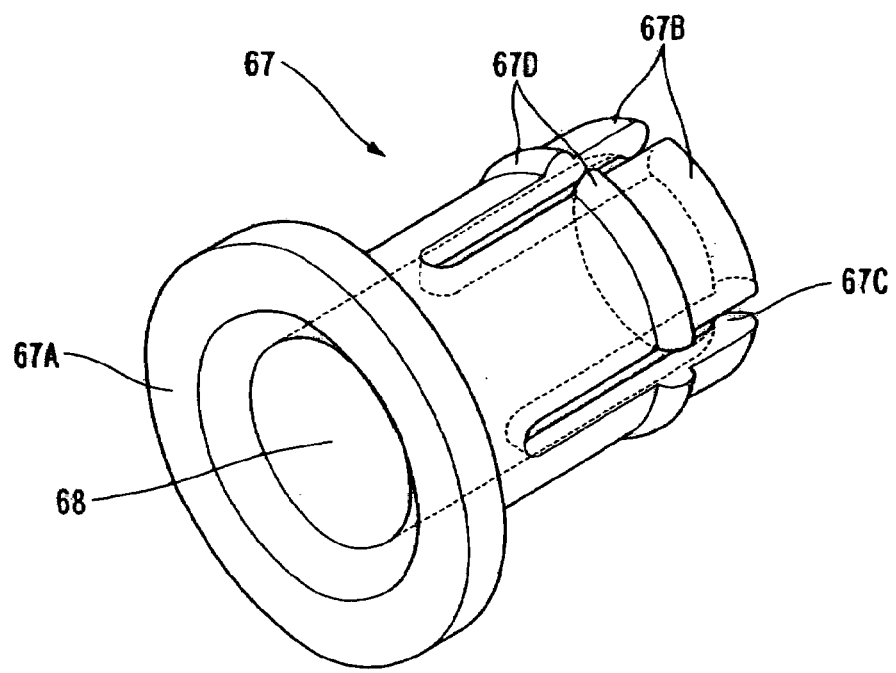
FIG. 15 is a perspective view of the tubular linking section in the changeover system.

As shown in FIG. 4, FIG. 6, and FIG. 16, branch conveyors 151A, 151B forming branch paths 150A, 150B that are tilted outwardly and downwardly with respect to the main conveying path 45 are provided outwardly on both sides of the main frame 1. Those branch conveyors 151A, 151B are configured to support a multiplicity of rollers 153 on a conveyor frame 152. Here, the distal ends of the conveyor frame 152 and rollers 153 are positioned inside a step 12 of the upper frame member 10, and the conveyor frame and rollers are disposed so as to be sufficiently close to the side plate section 141 of the cover body 140.

Branch conveying surfaces 150a, 150b of the branch paths 150A, 150B are at the same level as the upper surface 54a of the article carry plate section 54 and the uppermost surface 142a of the transverse plate section 142A. A control body 155 for preventing the undesirable movement of the cover body 140 is provided at the end section of the conveyor frame 152. This control body 155 is abutted by the inner end thereof against the upper rising plate section 141C of the side plate section 141. Here, the control body 155 is connected to the conveyor frame 152, so that the control position can be freely adjusted, by screwing a threaded body 157 that passes from above into a long orifice 156 into the conveyor frame 152. The upward dovetail groove 15 of the upper frame member 10 may be also used for connection to the branch conveyors 151A, 151B. The reference numeral 160 stands for an article.

The changeover system assembling and the operations of conveying and branching the articles 160 of the above-described first embodiment will be described below.

When the changeover system is installed, the main frame 1 is assembled as frame set, then the endless chain 40 and article support body 50 are assembled with the main frame 1, and the cover body 140 is installed on the upper ends of both upper frame members 10.

Thus, a pair of insertion sections 63 of the side bracket 61 are inserted into a pair (front and rear) of spaces formed in the article support body 50, the inner surface side of the side bracket 61 is brought into contact with the end surface side of the article support body 50, and the bolt body 69 that was passed from the outside into the through hole 64 is threaded and joined with any of the threaded sections 55A, 56A. The side brackets 61 can be thus attached to both ends of the article support body 50. Here, before both side brackets 61 are attached, or after one side bracket 61 is attached, the article transverse pushing body 80 is externally fitted over the article support body 50.

Furthermore, before both side brackets 61 are attached or after both side brackets 61 have been attached, the tubular linking section 67, rotary body 70, or side roller 71 is set on the side of the side brackets. Thus, the tubular linking section 67 is inserted from the outside into the tubular body 65, the collar section 67A of the tubular linking section is positioned by abutting against the outer end surface of the tubular body 65, and outward facing convex sections 67D of the group of tongue section 67B are elastically engaged with the annular groove 65A, thereby linking the linking section 67 with the tubular section 65 by internal fitting and thus making it possible to set the tubular linking section 67 at the side bracket 61. The rotary body 70 is fitted externally over the rotary body 65, and the side roller 71 is rotatably attached to the protruding piece 62A via the longitudinal shaft 72.

Figure 5:
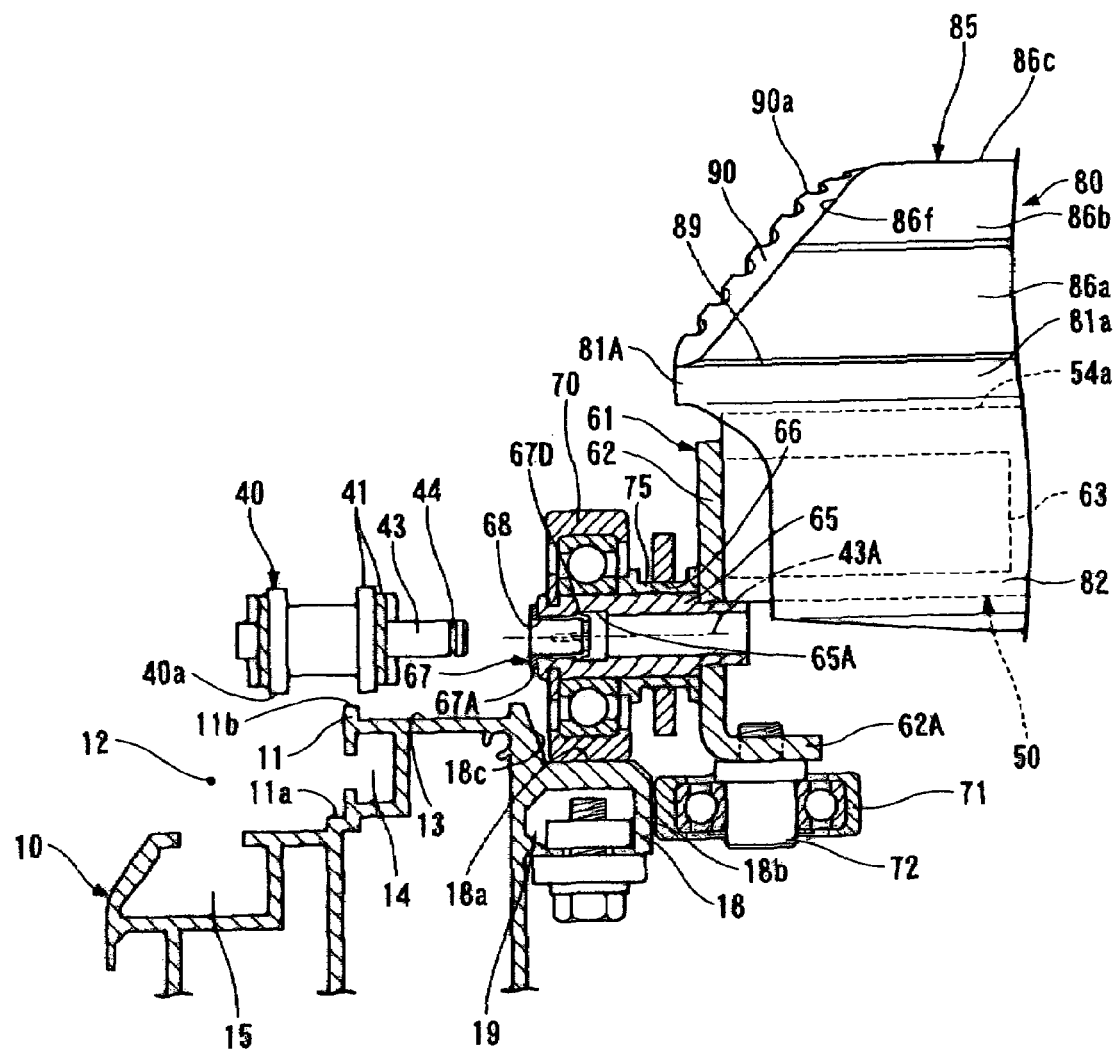
FIG. 5 is a front view of a longitudinal section of the main portion illustrating the mounting and dismounting state of an endless rotary body in the changeover system.

After the side brackets 61 have thus been attached to both ends of the article support body 50, the special long link pins 43 present in the endless chain 40 are inserted into and joined with the tubular linking section 67, thereby making it possible to link both ends of the article support body 50 to the endless chain 40 via respective side brackets 61. Thus, as shown in FIG. 5, the prescribed sites of the endless chains 40 are moved to the outside (bent) to move those prescribed sites to the outside over the rising section 11 and thereby positioning the protruding sections of the long linking pins 43 above the lubricating oil receiving sections 13.

After the protruding sections of the long linking pins 43 and insertion holes 68 of the tubular linking section 67 are disposed opposite each other, the long linking pins 43 can be joined with the side brackets 61 by inserting the protruding sections of the long linking pins 43 from the outside into the insertion holes 68 and elastically engaging the inward convex section 67C of the group of tongue sections 67B with the outward concave sections 44.

Both ends of the article support body 50 can thus be linked to the endless chains 40 via the respective side brackets 61. In this process, the operation of inserting (linking) the long linking pins 43 from the outside is not hindered by the rising section 11 and can be carried out with good operability, rapidly and in an easy manner. Furthermore, the operation of pulling out (releasing the link) the long linking pins 43 to the outside is neither hindered by the rising section 11 and can be carried out with good operability, rapidly and in an easy manner.

A multiplicity of article supporting bodies 50 can be attached between a pair of left and right endless chains 40 by successively conducting the above-described linking operations. Here, the engaging sections 66 of the side bracket 61 are externally joined to the tubular body 65 in the adjacent side bracket 61.

The cover body 140 is then installed at the upper ends of both upper frame members 10. Thus, after the lower rising plate section 141A has been abutted from the outside against the rising section 11 and the lower end of the lower rising plate section 141A has been abutted from above against the receiving surface 11a, the bolt 145 that was passed from the outside to the lower end portion of the lower rising plate section 141A is threaded into the nut body 146 that was positioned in advance inside the outward groove 14, thereby enabling detachable attachment to the rising section 11 of the upper frame member 10.

Here, the uppermost surface 142a of the transverse plate section 142A in the upper plate section 142 can be positioned at the same level as the upper surface 54a of the article carry plate section 54 and slightly below the flat surface 52a, and the tilted upper surface 142b of the inner end tilted section 142B can be in a low position lowered with respect to the upper surface 54a of the article carry plate section 54. Such mutual arrangement can be constantly maintained by abutting the lower end of the lower rising plate section 141A from above against the receiving surface 11a.

Before or after such attachment of the article support bodies 50 and installation of the cover body 140, the forward guide device 110, homeward guide device 116, upper switching means 130, lower switching means 131, and distribution means 132A, 132B are installed at the main frame 1. The changeover system is thereby assembled.

In the changeover system that was thus assembled, both endless chains 40 can be moved by actuating the motor 35 of the drive apparatus 34 and forcibly rotating the sprocket 39 via the drive shaft 31 operably linked to the reduction gear 36. Due to the movement of the two endless chains 40, the group of the article support bodies 50 are supported and guided via the rotary bodies 70 by the upward support surfaces 18a, 26a of the two guide rail sections 18, 26 and also guided via the side rollers 71 by the sidewise guide surfaces 18b, 29a of the two guide rail sections 18, 26, thereby enabling the stable movement. Here, at the rearward side, because the upper end extension section 29 is positioned above the rotary body 70, the rotary body 70 can be prevented from lifting, thereby enabling the stable movement, without shaking in the vertical direction, of the group of the article support bodies 50. As a result, because the group of the article support bodies 50 moves in a circulation fashion, the articles 160 supplied onto the group of the article support bodies 50 at the leading end can be conveyed along the main conveying path 45.

During the conveying, the movement of both endless chains 40 in the forward path is implemented below the cover body 140 and above the lubricating oil receiving section 13, and the movement of both endless chains 40 in the homeward path is implemented below the upper end extension section 29 and above the lubricating oil receiving section 25.

When such conveying is performed, the article transverse pushing body 80 that moves integrally with the group of the article support bodies 50 is moved reciprocally in the lengthwise direction 51 of the article support body 50 via the guided section 96 or moves linearly along the main conveying path 45 together with the article support body 50 because the guide roller 108 thereof is guided by the group of guide devices 110, 116.

Thus, for example, when the distribution means 132A is in a linear distribution mode, the guide roller 108 that is guided by the leading end guide section 111A located on one side is guided straight forward and then guided by the trailing end guide section 114A after advancing to a state where the aforementioned guiding action is not received. As a result, the article transverse pushing body 80 does not act upon the article 160, and the article 160 is conveyed straight along the main conveying path 45. On the opposite side, the guide roller 108 of the leading end guide section 111B similarly moves from the distribution means 132B to the trailing end guide section 114B.

Furthermore, when the distribution means 132A is in a tilted distribution mode, the guide roller 108, which is guided by the leading-end guide section 111A on one side, is guided with an inward inclination and then guided by the inner movement guide section 112A and moved inwardly. Then, the guide roller is transferred to the outer movement guide section 113B via the upper switching means 130, guided by the outer movement guide section 113B, moved to the outside and then guided by the trailing-end guide section 114B. As a result, the group of the article transverse pushing bodies 80 crosses the main conveying path 45, while moving in the conveying direction. For this reason, the transverse pushing action section 85 located on the other side acts transversely upon the article 160, and the article 160 is moved to a branch at an angle to the main conveying path 45, while changing the orientation thereof, and transferred to the other branch conveyor 151B.

On the opposite side, the guide roller 108 of the leading end guide section 111B is similarly guided by the distribution means 132B, inner movement guide section 112B, upper switching means 130, outer movement guide section 113A, and trailing-end guide section 114A, the transverse pushing action section 85 located on one side of the group of the article transverse pushing bodies 80 acts transversely upon the article 160 via the transverse pushing abutment member 90, and the article 160 is transferred to the other branch conveyor 151A.

The guide rollers 108 that thus reached the ends of the trailing-end guide sections 114A, 114B are guided by the reverse guide bodies 136A, 136B and reversed. Then, in the homeward guide apparatus 116, the guide rollers are first guided by the inner movement guide sections 117A, 117B, moved to the central section, then distributed to the left and right by the lower switching means 131 and then moved to the outside by the guidance of the outer movement guide sections 118A, 118B. Then, after they were guided and reversed by the reverse guide bodies 135A, 135B, they are moved to any of the leading end guide sections 111A, 111B.

In the course of such reverse operation, the front and rear side brackets 61 undergo relative extension and contraction. As a result, the engaging sections 66 and ring bodies 75 are brought into sliding contact, but because this is the sliding contact between the engaging bodies 66 made from iron and the ring bodies 75 made from a resin, that is, the sliding contact in which the engaging surfaces are from different materials, the occurrence of wear and noise can be reduced by comparison with that during the sliding contact between the materials with identical engaging surfaces.

In an idle state without transverse pushing or movement by the article transverse pushing body 80 or in a light-load state where a light article 160 is pushed transversely and moved in the process of moving the article transverse pushing body 80 in the above-described manner, the abutting sections 101a of both upward tongue bodies 101 abut from below against the flat surfaces 53a of the convex sections 53, the lower guided surfaces 96b, 97b are pressed against the lower guide surfaces 59b, 60b by the push-down forces induced by the elastic repulsion, the abutting sections 103a of both forward tongue pieces 103 abut from inside against the front and rear guide surfaces 59a of the guide sections 59, and the front and rear guided surfaces 97a are pressed against the front and rear guide surfaces 60a of the guide sections 60 by the rear pushing force induced by the elastic repulsion.

As a result, the reciprocating movement of the article transverse pushing body 80 in the lengthwise direction 51 of the article support body 50 is executed in a state where the abutting section 101a elastically abuts and slides against the flat surface 53a, the lower guided surfaces 96b, 97b abut and slide against the lower guide surfaces 59b, 60b, the abutting section 103a elastically abuts and slides against the front and rear guide surfaces 59a, and the front and rear guided surfaces 97a abut and slide against the front and rear guide surfaces 60a.

In a heavy-load state where the article transverse pushing body 80 pushes transversely and moves a heavy article 160, the article transverse pushing body 80 is slightly displaced with respect to the article support body 50 by the transverse pushing eccentric load. Thus, on the side of abutment against the article 160, the guide sections 96, 97 rise against the elastic force of the upward tongue body 101, and the upper guided surfaces 96c, 97c abut from below against the flat surface 53a of the convex section 53. Furthermore, on the side opposite that of abutment against the article 160, the front and rear guided surfaces 96a abut from inside against the front and rear guide surfaces 59a against the elastic force of the forward tongue bodies 103.

As a result, the reciprocating movement of the article transverse pushing body 80 in the lengthwise direction 51 of the article support body 50 is executed in a state where the upper guided surfaces 96c, 97c and abutting section 101a elastically abut and slide against the flat surface 53a, the lower guided surfaces 96b, 97b abut and slide against the lower guide surfaces 59b, 60b, the front and rear guided surfaces 96a and abutting section 103a abut and slide against the front and rear guide surfaces 59a, and the front and rear guided surfaces 97a abut and slide against the front and rear guide surfaces 60a.

As a result of those movements, the reciprocating movement of the article transverse pushing body 80 is always executed with good stability without shaking and without significant changes in the posture (orientation) in a state where the engagement with and guidance by the guide sections 59, 60 in the article support body 50 are carried out via the front and rear guided sections 96, 97, that is, in a state where the advantageous sliding contact friction has occurred. Furthermore, because the groups of tongue bodies 101, 103 are formed with distribution to both ends in the lengthwise direction 51, the movement of the transverse pushing body 80 is executed in a state where the advantageous sliding contact friction has occurred to the same degree in the forward and homeward directions.

Furthermore, a downward facing convex section 53 is formed on the lower surface of the article carry plate section 54, the lower section of the convex section 53 is formed as a flat surface 53a, and the upper surfaces of the guided sections 96, 97 are formed as upper guided surfaces 96c, 97c facing the flat surface 53a from below. With such configuration, when the group of the article transverse push bodies 80 move in the lengthwise direction 51, the upper guided surfaces 96c, 97c slide over the flat surface 53a. As a result, this movement is executed in a state with a small friction resistance, thereby providing for smooth desired movement, without damaging the article transverse push bodies 80 or causing wear of the article support body 50.

As described hereinabove, because the group of article transverse push bodies 80 cross the main conveying path 45, while moving in the conveying direction, the transverse pushing action section 85 acts upon the article 160 by pushing it sidewise, the article 160 is moved to a branch and transferred to the branch conveyors 115A, 115B. However, because in this process the article 160 is supported between the flat surfaces 52a of the group of convex sections 52 and slides over the flat surfaces 52a, this branching movement is executed in a state with a small friction resistance, thereby providing for smooth desired branching movement, without damaging the article 160 or causing wear of the article support body 50.

In the side portion of the transverse pushing action section 85, the left and right corner portions of the front end section 81A are formed at the circular-arc side surface 81b and a transverse pushing abutment member 90 is provided so that the transverse pushing abutment surface 90a is connected to the rear end of the circular-arc side surface 81b. Therefore, almost the entire length of the side section in the transverse pushing action section 85 can serve as a transverse push action surface, thereby enabling a stable transverse push movement and also reducing a gap S (see FIG. 6) between the transverse pushing operation sections 85 in the front and rear article transverse push bodies 80 and enabling the desired transverse push movement without the article 160 getting into way.

The upper part of the transverse pushing action section 85 is formed at the tilted upper surface 86a in which the middle portion in the front-rear direction is tilted forward, and a leading-end concave circular-arc upper surface 81a provided at a gradual angle with respect to the tilted upper surface 86a is formed in the front end portion conjointly with the tilted upper surface 86a. As a result, for example, as the transverse push is started, when the article 160 assumes a state in which it is sandwiched between the front and rear article transverse push bodies 80, first, the leading-end concave circular-arc upper surface 81a, which is formed at a gradual angle, smoothly enters below the article 160 and then the article 160 is lifted by the tilted upper surface 86a. Therefore, the desired transverse push movement can be implemented without clasping, thereby preventing the article 160 or article transverse pushing body 80 from damage. Furthermore, because the left and right corner portions of the front end section 81A are formed at the circular-arc side surface 81b, the entrance below the article 160 can be carried out even more smoothly.

As described above, because the group of article transverse push bodies 80 cross the main conveying path 45, while moving in the conveying direction, the transverse pushing action section 85 acts upon the article 160 by pushing it sidewise, the article 160 is moved to a branch and transferred to the branch conveyors 115A, 115B. However, because in this process the article 160 located on the article support body 50 is transferred above the cover body 140 that is fixed to the upper frame member 10 in order to close the endless chains 40 from above, the dust etc. that adhered to the article 160 is prevented from falling onto the endless chains 40.

Here, because the uppermost surface 142a of the cover body 140 is positioned at the same level as the upper surface 54a of the article support body 50 and the branch conveying surfaces 150a, 150b of the branch paths 150A, 150B are positioned at the same level as the uppermost surface 142a, the article 160 coming from the article support body 50 can be smoothly moved, without shaking in the vertical direction, from the uppermost surface 142a to the branch conveying surfaces 150a, 150b and the damage of the article 160 and the generation of noise can be prevented.

Furthermore, because the inner end portion of the cover body 140 is formed at the tilted upper surface 142a that tilts downward with respect to the upper surface 54a, for example, even if the article 160 itself is soft or when the packaging material of the article 160 is soft and the article comes into contact with the upper surface 54a in a hanging state due to flexion thereof, when the article is transferred from the upper surface 54a to the uppermost surface 142a during the branch movement, the article is initially supported and stopped by the tilted upper surface 142a and guided toward the uppermost surface 142a. As a result, the hanging portion thereof can be reliably moved to a branch above the cover body 140, without entering below the cover body 140.

Furthermore, because the concave section 144 is formed on the inner surface side of the corner section 143 formed by the side plate section 141 and upper plate section 142 of the cover body 140, when a large impact is produced by the article 160 coming into contact with the uppermost surface 142a from the article support body 50, the upper plate section 142 assumes a bent shape via the concave section 144, thereby enabling the relaxation of the impact.

Figure 21:
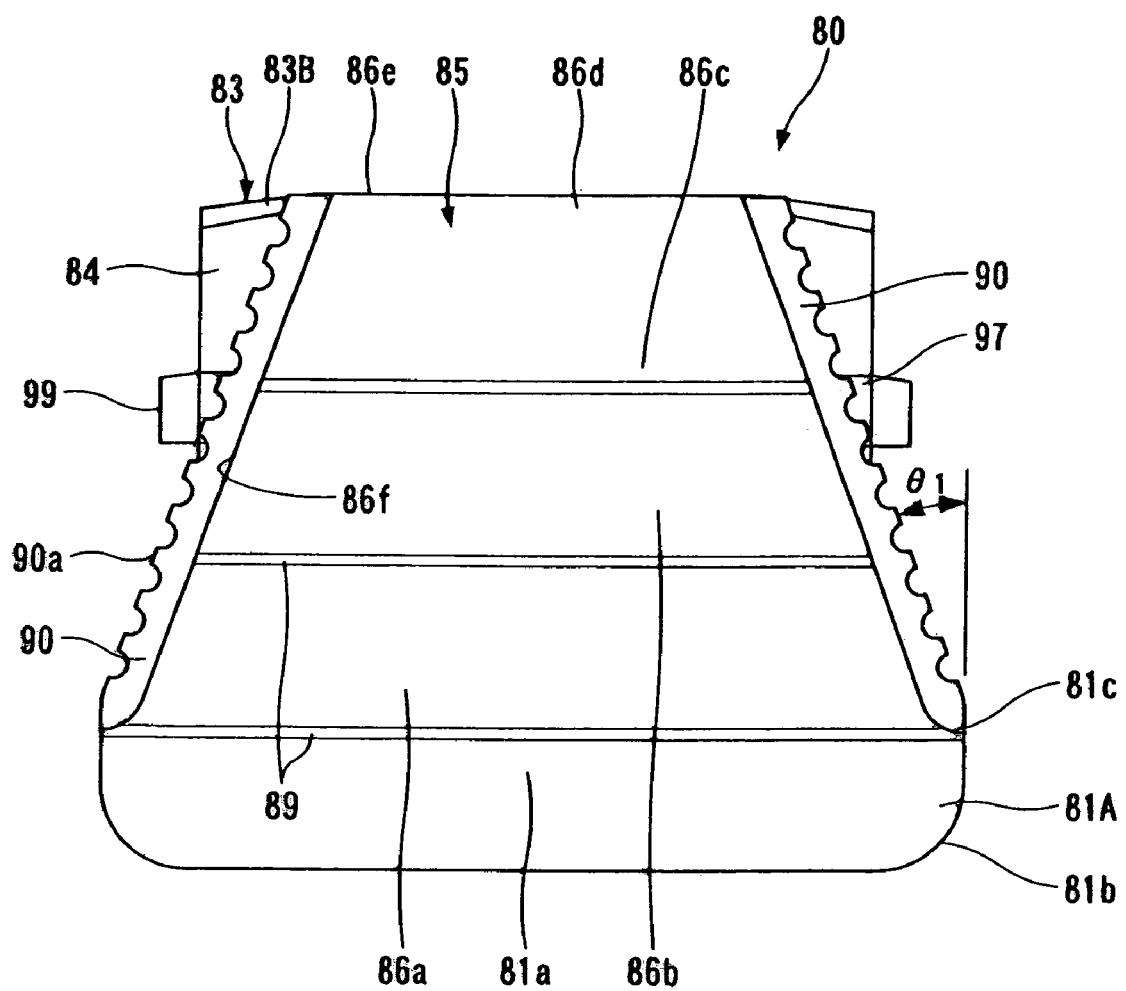
FIG. 21 is a side view of a longitudinal section of an article support body portion with an article transverse pushing body in the changeover system, illustrating the second embodiment of the present invention.

The second embodiment of the present invention will be described below with reference to FIG. 21.

In the above-described first embodiment, the transverse pushing abutment member 90 was detachably attached to the transverse pushing action section 85 in a state where the rear part of the transverse pushing abutment surface 90a of the transverse pushing abutment member was inclined at an inclination angle θ of 30 degrees toward the other side surface with respect to the front part, but in the second embodiment a configuration was used in which the transverse pushing abutment member 90 was detachably attached to the transverse pushing action section 85 in a state in which the rear part of the transverse pushing abutment surface 90a of the transverse pushing abutment member was inclined at an inclination angle $θ_1$ of 20 degrees toward the other side surface with respect to the front part.

Figure 22:
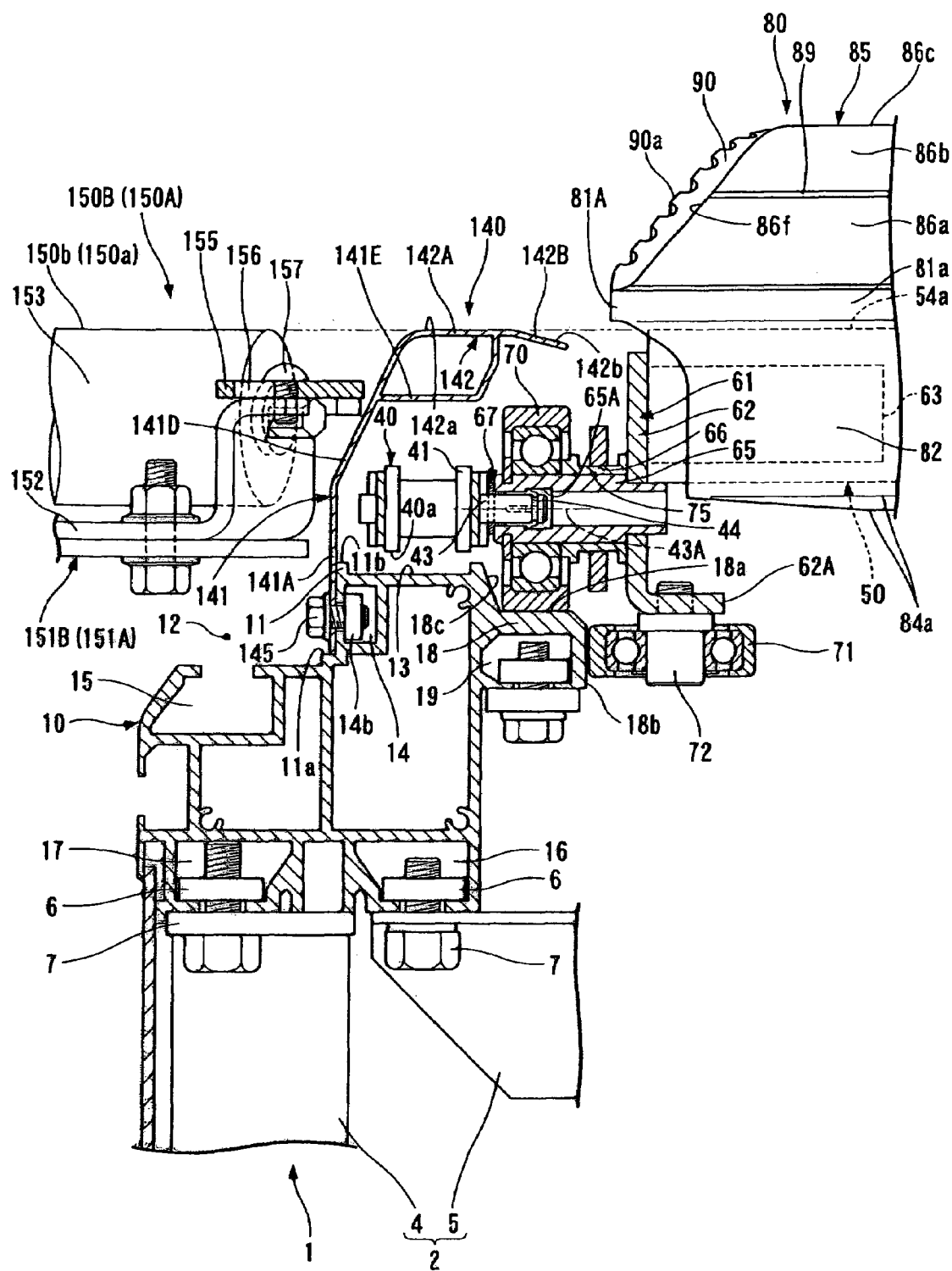
FIG. 22 is a front view of a longitudinal section of an upper frame member portion in the changeover system, illustrating the third embodiment of the present invention.

The third embodiment of the present invention will be described below with reference to FIG. 22.

In the above-described first embodiment, a configuration was used in which when the cover body 140 was formed into a shaped rail with a cross section in the form of inverted L from the side plate section 141 and upper plate section 142 bent at a right angle inwardly from the upper part of the side plate section 141, the side plate section 141 was formed from the lower rising plate section 141A, the middle tilted plate section 141B that was tilted inwardly as it rose, and the upper rising plate section 141C, but in the third embodiment, a configuration is employed in which the side plate section 141 is formed from the lower rising plate section 141A and upper tilted plate section 141D that is tilted inwardly as it rises, and the reinforcing plate section 141E is provided between the inner side surfaces of the upper tilted plate section 141D and the transverse plate section 142A in the upper plate section 142.

Figure 23:
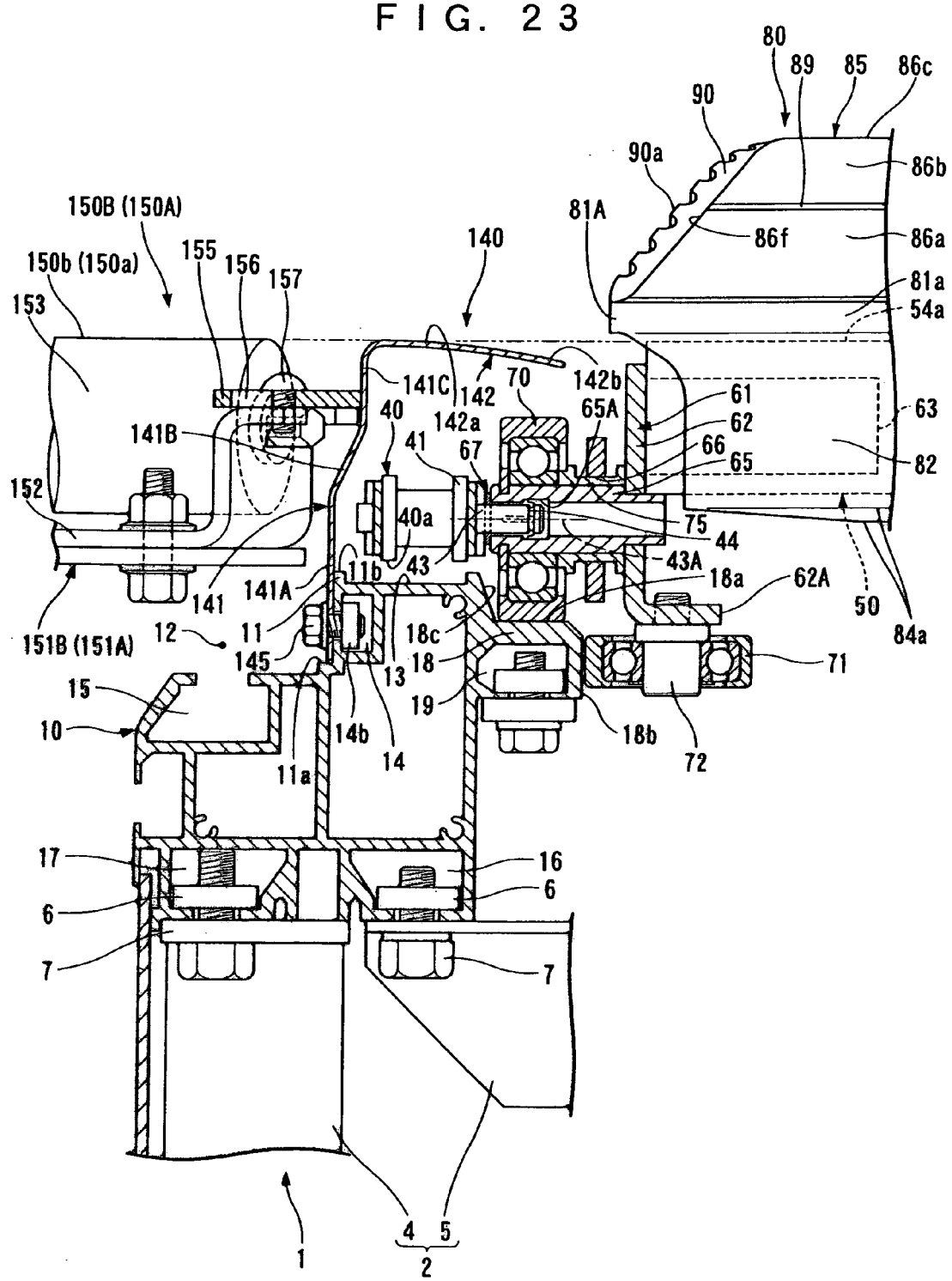
FIG. 23 is a front view of a longitudinal section of an upper frame member portion in the changeover system, illustrating the fourth embodiment of the present invention.

The fourth embodiment of the present invention will be described below with reference to FIG. 23.

In the above-described first embodiment, a configuration was used in which when the cover body 140 was formed into a shaped rail with a cross section in the form of inverted L from the side plate section 141 and upper plate section 142 bent at a right angle inwardly from the upper part of the side plate section 141, the upper plate section 142 was formed from the horizontal transverse plate section 142A and the inner end tilted section 142B that was tilted downward as it extended inwardly, but in the fourth embodiment a configuration is used in which the upper plate section 142 is formed as an upward convex circular arc connected inwardly from the upper part of the side plate section 141, the uppermost surface 142a is formed by the apex section in the form of a convex circular arc, and the tilted upper surface 142b is formed by a free end portion.

In the above-described first embodiment, the upper part of the transverse pushing action section 85 was formed at a tilted upper surface 86a in which the middle portion in the front-rear direction was tilted forward and downward and a leading end upper surface provided at a gradual angle with respect to the tilted upper surface 86a was formed in the front end portion conjointly with the tilted upper surface 86a, but a configuration in which the tilted upper surface 86a and the leading end upper surface are formed continually at the same angle may be also employed.

In the above-described first embodiment, the leading end upper surface was formed at a leading end concave-convex circular-arc upper surface 81a that is in the form of a concave-convex circular arc and rises gradually with a small inclination, and the tilted upper surface 86a was formed to have a linear shape and to rise gradually at an inclination angle larger than that of the leading end concave-convex circular-arc upper surface 81a, but a configuration in which the leading end concave-convex circular-arc upper surface 81a is formed on the liner upper surface or convex circular-arc upper surface or a configuration in which the tilted upper surface 86a is formed on the convex or concave circular-arc upper surface may be also employed.

In the above-described first embodiment, the rear end portion was formed at the convex circular-arc corner surface 86d in the upper part of the transverse pushing action section 85, but a configuration in which it is formed in a right-angle corner may be also employed.

In the above-described first embodiment, the leading end upper surface 81a, which is in the form of a convex circular arc and gradually rises with a small inclination, the tilted upper surface 86a, which has a linear shape and gradually rises at an inclination angle larger than that of the leading-end upper surface 81a, the front convex circular-arc upper surface 86b, which is in the form of a convex circular arc and gradually rises, the rear convex circular-arc upper surface 86c, which is in the form of a convex circular arc and forms an apex, the corner surface 86d, which is in the form of a convex circular air and descends, and the convex circular-arc rear surface 86e, which is in the form of a convex circular arc and descends are formed as the upper part of the transverse pushing action section 85 continually form the front section to the rear section, but a configuration in which the entire upper part of the transverse pushing action section 85 is formed as a continuous circular arc surface or a configuration in which the entire upper part is formed by continuously connected linear surfaces may be also employed.

In the above-described first embodiment, the left and right corner sections of the front end section 81A were formed at the circular-arc side surface 81b as side sections of the transverse pushing action section 85, and the transverse pushing abutment member 90 was formed so that the transverse pushing abutment surface 90a was connected to the rear end of the circular-arc side surface 81b, but a configuration in which the transverse pushing abutment surface 90a is formed as convex or concave steps in the plan view thereof with respect to the circular-arc side surface 81b may be also employed.

In the above-described first embodiment, a configuration was described in which the transverse pushing abutment member 90 was detachably attached by an engagement system to the portion of the sidewise tilted surface 86f where the transverse pushing action section 85 is tilted, but a configuration in which the transverse pushing abutment member 90 is fixed to the portion of the sidewise tilted surface 86f with an adhesive or by a bolt joint may be also employed.

In the above-described first embodiment, rib plate members 87 extending in the left-right direction and linking the top plate member 86 to the upper plate member 81 were provided as the transverse pushing action section 85, and a concave section 89 was formed along the entire length in the left-right direction in the position above the rib plate members 87 extending in the left-right direction at the upper surface of the top plate member 86, but a configuration in which the concave section 89 is formed in a portion in the left-right direction, or a configuration in which the rib plate members 87 extending in the left-right direction are not present, or a configuration in which the upper surface in the position above the rib plate members 87 extending in the left-right direction is formed as a flat or convex surface may be also employed.

In the above-described first embodiment, the upper plate member 81 of the article transverse pushing body 80 and the top plate member 86 of the transverse pushing action section 85, as described above, were formed, in the plan view thereof, to have a trapezoidal shape that had a large width in the front end section and then gradually narrows to have a small width in the rear end section, the bottom plate member 84 was formed to have a rectangular shape and protrude on both sides in the lengthwise direction 51 with respect to the trapezoidal upper plate member 81 or top plate member 86, but a configuration in which the bottom plate member 84 is formed so as to be accommodated below the trapezoidal upper plate member 81 or top plate member 86 may be also employed.

In the above-described first embodiment, the rear plate member 84 of the article transverse pushing body 80 was formed to have an inverted T shape by the narrow upper half section 83A joined to a narrow rear end section of the upper plate member 81 and a trapezoidal lower half section 83B that gradually expands, but a configuration in which the entire rear plate member 84 is formed to have a trapezoidal shape may be also employed.

In the above-described first embodiment, in the article support body 50, guide sections 59, 60 were formed between the leg plate sections 55, 56 by installing consecutively a pair of leg plate sections 55, 56 from the middle section on the lower surface of the article carry plate section 54, in the article transverse pushing body 80, the guided sections 96, 97 that are to be joined with the guide section 59, 60 were formed at the upper surface side of the bottom plate member 84, the guided sections 96, 97 had a rectangular shape elongated in the lengthwise direction in the plan view, and stopping sections 99 that established the movement limits in the lengthwise direction 51 were formed by the portions protruding in the width direction of the bottom plate member 84, but a configuration in which the guided sections 96, 97 are accommodated in the widthwise space of the bottom plate member 84 and the stopping section are formed separately may be also employed.

In the above-described first embodiment, the lower surface 84a of the bottom plate member 84 in the article transverse pushing body 80 was formed as a flat surface, but a configuration in which the lower plate of the bottom plate member 84 is formed to have a step, or a configuration in which it is formed as a double-bottom step may be also employed.

In the above-described first embodiment, the article support body 50 was composed of the flat article-carry plate section 54, leg plate sections 55, 56 were installed consecutively as a pair from the middle section of the lower surface of the article carry plate section 54 and forming the guide sections 59, 60 therebetween, the front plate section 57 extending downward from the front end of the article carry plate section 54, the front circular arc section 57A facing rearward from the lower end of the front plate section 57, the rear plate section 58 extending downward from the rear end of the article carry plate section 54, and the rear circular arc section 58A facing forward from the rear end of the rear plate section 58, and in the article transverse pushing body 80, the guided sections 96, 97 that are to be joined with the guide sections 59, 60 were formed on the upper surface side of the bottom plate member 84, which is faced from above by both circular-arc sections 57A, 58A, and the two circular-arc sections 57A, 58A were formed to be positioned below the lower ends of the two leg plate sections 55, 56, but a configuration in which portions of the two circular-arc sections 57A, 58A are formed as flat sections, a configuration in which the two circular-arc sections 57A, 58A or the flat sections are linked to the two leg plate sections 55, 56, or a configuration in which the two circular-arc sections 57A, 58A or the flat sections are formed to be positioned at the same level as the two leg plate sections 55, 56 or thereabove may be also employed.

In the above-described first embodiment, the upward facing convex sections 52 extending along the lengthwise direction 51 were formed at the upper surface 54a of the article carry plate section 54, concave groove sections 104 facing from above the convex sections 52 were formed on the side of the article transverse pushing body 80, and the upper portion of the convex section 52 was formed as a flat surface 52a, but a configuration in which the convex sections and concave grooves replace each other, or a configuration in which convex sections and concave grooves are not formed, or a configuration in which the upper portion of the convex section 52 is not in the form of a flat surface may be also employed.

In the above-described first embodiment, the downward facing convex sections 53 extending along the lengthwise direction 51 were formed at the lower surface of the article carry plate section 54, the upper surfaces of the guided sections 96, 97 were formed as the guided surfaces 96c, 97c facing the convex sections 53 from below, and the lower portion of the convex section 53 was formed as a flat surface 53a, but a configuration in which the convex sections 53 are not formed or a configuration in which the upper portion of the convex section 53 is not in the form of a flat surface may be also employed.

In the above-described first embodiment, a configuration was described in which the guide sections 59, 60 were formed between a pair of leg plate sections 55, 56 of the article support body 50, and the guided sections 96, 97 that are to be joined with the guide sections 59, 60 were formed at the upper surface side of the bottom plate member 84 in the article transverse pushing body 80, but a configuration in which the guided sections are formed on the outside of the two leg plate sections 55, 56 and the guided sections are formed correspondingly thereto on the side of the bottom plate member 84 may be also employed.

In the above-described first embodiment, a configuration was described in which the guide sections 59, 60 were formed as grooves opened to the mutually opposite sides by the article carry plate section 54 and the two leg plate sections 55, 56, in the guide sections 59, 60, front-back guide surfaces 59a, 60a were formed by the mutually opposing surfaces, the lower guide surfaces 59b, 60b were formed by the upward facing surfaces, the upper guide surface 53a was formed by the downward facing surface of the article carry plate section 54, and the guided sections 96, 97 could be guided by the guide surfaces 59a, 60a, 59b, 60b, 53a, but a configuration in which the upper guide surface 53a is formed separately from the downward surface of the article carry plate section 54 may be also employed.

In the above-described first embodiment, an upward facing elastic body (upward tongue body 101) capable of abutting from below against the article carry plate section 54 in the article support body 50 and a forward facing elastic body (forward tongue body 103) capable of abutting from inside against the front leg plate section 55 were provided at the article transverse pushing body 80 on the side of the guided sections 96, but a configuration may be also used in which one of the upward facing elastic body and forward facing elastic body, or both bodies are omitted. Furthermore, in addition to a tongue-like shape of the upward facing elastic body and forward facing elastic body, a protrusion-like shape or a shape having another member joined thereto may be also employed.

In the above-described first embodiment, a configuration was described in which the guided body (guide roller 108), which is guided by the guide devices 110, 116 on the side of the main frame 1 is attached to the protruding lower section of the support shaft (roller shaft 107) provided vertically by embedding and supporting the upper portion of the guided body in the central section of the guided sections 96, 97, but a configuration in which the guided body is attached to the support shaft section provided integrally in a hanging condition from the lower section of the article transverse pushing body 80 may be also employed.

In the above-described first embodiment, a configuration was described in which, on the side of the lower section of article transverse pushing body, the upper plate member 81, front plate member 82, and rear plate member 83 of the article transverse pushing body 80 were formed with uniform thickness in parts thereof and the front plate member 82 and rear plate member 83 were formed so that the thickness gradually increases toward the opposite side (central side 80) with the extension thereof downward with respect to the upper plate member 81, but a configuration in which the thickness of any one or two members of the upper plate member 81, front plate member 82, and rear plate member 83 is larger than the thickness of the remaining plate member(s), or a configuration in which the members are formed to have a large plate thickness from the very beginning over the entire length, or a configuration in which the front plate member 82 and rear plate member 83 are formed so that the thickness thereof gradually increases toward the mutually different sides with the extension thereof downward with respect to the upper plate member 81, or a configuration in which the front plate member 82 and rear plate member 83 are formed so that the thickness thereof gradually increases toward the sides in the same direction with the extension thereof downward with respect to the upper plate member 81, or a configuration in which the upper plate member 81, front plate member 82, and rear plate member 83 have absolutely identical thickness may be also employed.

In the above-described first embodiment, a configuration was described in which the front plate section 57 and rear plate section 58 of the article support body 50 were formed with inward inclination such that they gradually approached each other toward the mutually opposite sides with the extension thereof downward from the article carry plate section 54, and the front plate member 82 and rear plate member 83 of the article transverse pushing body 80 were formed so that the thickness gradually increased toward the opposite side with the extension thereof downward with respect to the upper plate member 81, but a configuration in which the front plate section 57 and rear plate section 58 are formed so as to extend downward vertically from the article carry plate section 54, or a configuration in which the front plate section 57 and rear plate section 58 are formed so as to incline gradually toward the sides in the same direction in the front and in the rear as extending downward vertically from the article carry plate section 54, or a configuration in which the front plate section 57 and rear plate section 58 are formed so as to incline outwardly so that the distance therebetween increases gradually toward the mutually opposing sides as extending downward from the article carry plate section 54 may be also employed.

In the above-described first embodiment, a configuration was described in which the front plate member 82 and rear plate member 83 of the article transverse pushing body 80 were formed so that the thickness gradually increased toward the opposite side with the extension thereof downward with respect to the upper plate member 81, the bottom plate member 84 positioned between the lower ends of the front plate member 82 and rear plate member 83 was formed to be thick continuously with the lower ends of the front plate member 82 and rear plate member 83, and the bottom plate member 84 was also formed so that the plate thickness increased gradually, sandwiching the hollow space 84A, as the bottom plate member extended from the portion connected to the lower ends of the front plate member 82 and rear plate member 83 to the central portion, but a configuration in which the bottom plate member 84 is formed to be thin, or a configuration in which the bottom plate member 84 was formed to have the same thickness, or a configuration in which the bottom plate member 84 as formed as a double-bottom plate may be also employed.

In the above-described first embodiment, a configuration was described in which a cover body 140 for closing the endless rotary bodies (endless chains 40) from above was disposed in the upper part of the main frame 1, the uppermost surface 142a of the cover body 140 was disposed as the same level as the upper surface 54a of the cover body was disposed as the same level as the upper surface 54a of the article support body 50, and the inner end portion was formed as a tilted upper surface 142b lowered with respect to the upper surface 54a of the article support body 50, but a configuration in which the uppermost surface 142a of the cover body 140 is positioned at a lower level than the upper surface 54a of the article support body 50 or a configuration in which the inner end portion of the cover body 140 is positioned at the same level as the upper surface 54a of the article support body 50 may be also employed.

In the above-described first embodiment, a configuration was described in which the cover body 140 was formed to have a shape of inverted L by the side plate section 141 and an upper plate section 142 that was bent at a right angle inwardly from the upper portion of the side plate section 141 and was fixed to the side of the main frame 1 in a state where the side plate section 141 was abutted from the outside against the rising section 11, and the uppermost surface 142a and tilted upper surface 142b were formed by the upper plate section 142, but a configuration in which may be also employed in which the upper plate sections in the form of upward convex circular arcs are installed consecutively from the upper part of the side plate section 141 inwardly, the uppermost surface is formed by the convex circular-arc apex section, and the tilted upper surface is formed by the free end portion.

In the above-described first embodiment, a configuration was described in which the upward receiving surface 11a was positioned on the outer side of the rising section 11 and formed in the upper part of the main frame 1, and the cover body 140 was fixed to the side of the main frame 1 in a state where the side plate section 141 was abutted from the outside against the rising section 11 and the lower end of the side plate section 141 was abutted against the receiving surface 11a, but a configuration in which the receiving surface 11a is not formed may be also employed.

In the above-described first embodiment, a configuration was described in which the cover body 140 was formed to have a shape of inverted L by the side plate section 141 and an upper plate section 142, the uppermost surface 142a and tilted upper surface 142b were formed by the upper plate section 142, and the concave section 144 was formed on the inner surface side of the corner section 143 formed by the side plate section 141 and an upper plate section 142, but a configuration in which the convex section 144 is not formed may be also employed.

In the above-described first embodiment, a configuration was described in which branch paths 150A, 150B relating to the main conveying path 45 were provided outwardly on the side of the main frame 1, and the branch conveying surfaces 150a, 150b of the branch paths 150A, 150B were positioned at the same level as the uppermost surface 142a of he cover body 140, but a configuration in which the branch conveying surfaces 150a, 150b are positioned at a lower level than the uppermost surface 142a may be also employed.

In the above-described first embodiment, a configuration was described in which the upward rising section 11 was formed in the upper part of the main frame 1, the guide rail section 18 was formed inside the rising section 11, and the upward support surface 18a of the guide rail section 18 was configured so as to support and guide the guided member (rotary body 70) in a position at the same level or slightly below the upper end 11b of the rising section 11, but a configuration in which the guide rail section is installed separately or a configuration in which the upward support surface 18a of the guide rail section 18 is in a position significantly lower than the upper end 11b of the rising section 11 may be also employed.

In the above-described first embodiment, a configuration was described in which the article support body 50 was attached between the endless rotary bodies (endless chains 40) via the side brackets provided at both ends, the guide rail section 18 was formed in the upper section of the main frame 1, the upward support surface 18a and inward sidewise guide surface 18b were formed in the guide rail section 18, and the guided member (rotary body 70) that was supported and guided by the upward support surface 18a and the guided member (side roller 71) that was guided by the sidewise guide surface 18b were provided at the side of the side brackets 61, but a configuration in which the sidewise guide surface 18b and guided members are not used may be also employed.

In the above-described first embodiment, a configuration was described in which the guided member comprised a rotary body 70 that could rotate about the axial center (linking axial center 43A) parallel to the lengthwise direction 51, and the upper end 11b of the rising section 11 was positioned below this axial center (linking axial center 43A), but a configuration in which the axial center (linking axial center 43A) is positioned below the upper end 11b of the rising section 11 may be also employed.

In the above-described first embodiment, a configuration was described in which the upper end 11b of the rising section 11 was positioned below the lower surface 40a of the endless rotary body (endless chain 40), but a configuration in which the lower surface 40a of the endless rotary body (endless chain 40) is positioned below the upper end 11b of the rising section 11 may be also employed. In this case, the prescribed location of the endless chain 40 is slightly raised, e.g., by lifting, to insert the tubular link section 67 into the specific long link pin 43 and join them together and the lower surface 40a of the endless chain is positioned higher than the upper end 11b of the rising section 11 and then moved to the outside (bent), thereby moving this prescribed location to the outside over the rising section 11 and thus positioning the protruding section of the long linking pin 43 above the lubricating oil receiving section 13.

In the above-described first embodiment, a configuration was described in which the endless chains 40 were used as the endless rotary bodies and the protruding sections were configured by long linking pins 43 formed by protruding inwardly the specific linking pins, of a group of linking pins 42 that link the links 41, but a configuration in which the protruding sections are formed in specific locations of the endless chains 40, or a configuration in which an endless belt with protruding sections formed in the prescribed locations may be also employed.

In the above-described first embodiment, a configuration was described in which the tubular linking sections 67 having the insertion holes 68 formed therein were provided in the side brackets 61 attached to both ends of the article support bodies 50, the inner end side formation portions of the insertion holes 68 in the tubular linking sections 67 were formed into a plurality of tongue sections 67B split in the circumferential direction, the inward convex sections 67C were formed in those tongue sections 67B, the protruding sections (the specific long link pin 43) protruding from the sides of the endless rotary bodies (endless chains 40) were configured to be inserted from the outside into the insertion holes 68 of the tubular linking bodies 67, and outward concave section 44 that could be elastically engaged with the inward convex sections 67C were formed in the protruding sections, but a configuration in which the convex sections 67C and outward concave sections 44 are not provided and the protruding sections are elastically fitted in and mated with the insertion holes 68, a configuration in which the protruding sections that protrude form the endless rotary body sides are inserted from the outside and mated with the insertion holes formed in the side brackets themselves, or a configuration in which joining to the side brackets themselves is performed with bolts may be also employed.

In the above-described first embodiment, a configuration was described in which the tubular linking sections 67 were configured so that they were free to mate internally with the tubular bodies 65 provided at the side of the side brackets 61, annular grooves 65A were formed on the inner peripheral surface side of the tubular bodies 65, and outward facing convex sections 67D that were free to engage elastically with the annular grooves 65A were formed in the tongue sections 67B of the tubular linking sections 67, but a configuration in which the annular grooves 65A and outward facing convex sections 67D are not provided and the tubular linking sections 67 are elastically fitted in and mated with the tubular bodies 65 may be also employed.

In the above-described first embodiment, a configuration was described in which the tubular linking sections 67 were made from a resin and collars 67A that were free to abut against the outer end surface of the tubular bodies 65 were formed at the outer ends thereof, but a configuration in which the collars 67A are omitted and fixing is conducted in an aligned state may be also employed.

In the above-described first embodiment, a configuration was described in which the engaging surfaces of the engaging sections 66 and sides of the tubular linking sections 65 were made from different materials, but a configuration in which they are made of the same material may be also employed.

In the above-described first embodiment, a configuration was described in which the engaging sections 66 made from iron and ring bodies 75 made from a resin were used, but a configuration in which the engaging sections 66 are made from a resin and the ring bodies 75 are made from iron may be also employed.

In the above-described first embodiment, a configuration was described in which the article support body 50 was configured as a shaped rail open at the lower surface side, but a configuration in which the rail is not open may be also employed.

In the above-described first embodiment, a configuration was described in which the respective branch conveyors 151A, 151B were provided outwardly on both sides of the main frame, the articles 160 were pushed transversely and distributed and delivered outwardly at both side sections of the main conveying path 45, but a configuration in which the branch conveyor (151A or 151B) is provided outwardly at one side of the main frame 1 may be also employed. Furthermore, the changeover system may be used in an assembly with a configuration where articles supplied from a plurality of carry conveyors are merged in one carry conveyor or a configuration in which articles from one carry conveyor are branched into a plurality of carry conveyors.

In the above-described first embodiment, a configuration was described in which the upper frame member 10 and lower frame member 20 were separated, but a configuration in which the lower frame member 20 is in the form of a side plate or side frame may be also employed.

In the above-described first embodiment the transverse pushing abutment member 90 was attached in a state where it was tilted at an inclination angle $\theta$ of 30 degrees, and in the above-described second embodiment the transverse pushing abutment member 90 was attached in a state where it was tilted at an inclination angle $\theta_1$ of 20 degrees, but this inclination angle can be set to any value.

In the above-described first embodiment, a changeover system was described in which the article transverse pushing body 80 mated eternally with the article support body 50 and guided in the lengthwise direction was provided at the article support body 50, but the changeover system comprising no article transverse pushing body 80 is also possible.

What is claimed is:

1. A changeover system, comprising:
   a pair of left and right endless rotary bodies installed along a main conveying path;
   a multiplicity of article support bodies each attached between the endless rotary bodies and having a direction perpendicular to the main conveying path as a lengthwise direction thereof; and
   an article transverse pushing body fitted over and guided by the article support body, wherein
   the article transverse pushing body comprises an upper plate member, a front plate member extending downward from the front end of the upper plate member, a rear plate member extending downward from the rear end of the upper plate member, a bottom plate member disposed between the lower ends of the front plate member and rear plate member, and a transverse pushing action section provided above the upper plate member,
   the transverse pushing action section having an upper part formed so that a tilted upper surface in which the middle portion in the front-rear direction is tilted forward and downward, and a leading-end upper surface provided at a gradual angle with respect to the tilted upper surface is formed in the front end portion continuous with the tilted upper surface.

2. The changeover system according to claim 1, wherein the leading-end upper surface is formed to have a concave circular arc shape and to rise gradually with a small inclination, and the tilted upper surface is formed to have a straight linear shape and to rise gradually at an inclination angle larger than that of the leading-end upper surface.

3. The changeover system according to claim 1, wherein a trailing-end portion is formed at the corner surface in the form of a convex circular arc in the upper part of the transverse pushing action section.

4. The changeover system according to claim 1, wherein the upper part of the transverse pushing action section comprises, continuously from the front to the back, the leading-end upper surface that has a concave circular arc shape and rises gradually with a small inclination, the tilted upper surface that has a straight linear shape and rises gradually at an inclination angle larger than that of the leading-end upper surface, a front convex circular-arc upper surface that has a convex circular-arc shape and rises gradually, a rear circular-arc upper surface that has a convex circular-arc shape and forms an apex section, a corner surface that has a convex circular-arc shape and descends, and a convex circular-arc rear surface that has a convex circular-arc shape and descends.

5. The changeover system according to claim 1, wherein in the side part of the transverse pushing action section, left and right corners of the front end section are formed as circular-arc side surfaces, and a transverse pushing abutment member is provided in a state so that the transverse pushing abutment surface is connected to the rear end of the circular-arc side surface.

6. The changeover system according to claim 1, wherein both side surfaces of the transverse pushing action section are formed by sidewise tilted surfaces that have a rising shape and are tilted by the rear part thereof toward the other side surface with respect to the front part, a transverse pushing abutment member in which the transverse pushing abutment surface is tilted by the rear part thereof toward the other side surface with respect to the front part is attached detachably to the portions of the sidewise tilted surfaces, protruding sections that can be inserted to the transverse pushing action section side are formed integrally in a plurality of front and rear locations on the inner surface side of the transverse pushing abutment member, downward locking sections are formed in a protruding conditions in the protruding sections, a group of engagement hole sections that can be freely engaged with the group of locking sections are formed in a plurality of front and rear locations on the left side and in a plurality of front and rear locations on the right side in the upper plate member, and the group of the engagement hole sections of the left row and the group of the engagement hole sections of the right row are formed to have mutually different shapes in the front-rear direction.

7. The changeover system according to claim 1, wherein
the transverse pushing action section comprises a top plate member that covers the upper plate member from above, and rib plate members located in the left-right direction and linking the top plate member to the upper plate member, the rib plate members being plural in number and located in the front-row direction, and
the group of the engagement hole sections of the left row and the group of the engagement hole sections of the right row are formed to have mutually different shapes in the front-rear direction, avoiding the rib plate members located in the left-right direction.

8. The changeover system according to claim 1, wherein the bottom surface of the bottom plate member is flat.

9. A changeover system, comprising:
a pair of left and right endless rotary bodies installed along a main conveying path;
a multiplicity of article support bodies each attached between the endless rotary bodies and having a direction perpendicular to the main conveying path as a lengthwise direction thereof; and
an article transverse pushing body fitted over and guided by the article support body, wherein
the article transverse pushing body comprises an upper plate member, a front plate member extending downward from the front end of the upper plate member, a rear plate member extending downward from the rear end of the upper plate member, a bottom plate member disposed between the lower ends of the front plate member and rear plate member, and a transverse pushing action section provided above the upper plate member, and
the transverse pushing action section comprises a top plate member that covers the upper plate member from above and rib plate members located in the left-right direction and linking the top plate member to the upper plate member, the top plate member having, on an upper surface thereof and at a position above the rib plate members located in the left-right direction, concave sections formed in the left-right direction.

10. The changeover system according to claim 9, wherein the concave sections are formed along the entire length in the left-right direction.

11. A changeover system, comprising:
a pair of left and right endless rotary bodies installed along a main conveying path;
a multiplicity of article support bodies each attached between the endless rotary bodies and having a direction perpendicular to the main conveying path as a lengthwise direction thereof; and
an article transverse pushing body fitted over and guided by the article support body, wherein
the article transverse pushing body comprises an upper plate member, a front plate member extending downward from the front end of the upper plate member, a rear plate member extending downward from the rear end of the upper plate member, a bottom plate member disposed between the lower ends of the front plate member and rear plate member, and a transverse pushing action section provided above the upper plate member, wherein the upper plate member and top plate member of the transverse pushing action section are formed to have a trapezoidal shape that has a large width in the front end section and gradually narrows to have a small width in the rear end section, as viewed in a plan thereof, and the bottom plate member is formed as a rectangular plate and protrudes at both aides in the lengthwise direction with respect to the upper plate member and the top plate member each having a trapezoidal shape.

12. The changeover system according to claim 11, wherein
the front plate member of the article transverse pushing body is formed as a rectangular plate with a width slightly less than that of the front end section of the upper plate member,
the rear plate member is formed to have an inverted T shape by a narrow upper half section joined to a narrow rear end section of the upper plate member and a trapezoidal lower half section that gradually expands to assume a width that is equal to the width of the front plate member, and the bottom plate member is formed to have a rectangular shape joined to the lower ends of the front plate member and the lower plate member.

13. The changeover system according to claim 11, wherein the article support body comprises a guide section formed between leg plate sections by providing a pair of leg plate sections continuously in the direction of the main conveying path from the middle section of the low surface of the article carry plate section, and the article transverse pushing body further comprises a guided section to be engaged with the guide section, formed on the upper surface side of the bottom plate member, the guided section having a rectangular shape elongated in the lengthwise direction, as viewed in a plan thereof, and a stopper section for controlling movement limits in the lengthwise direction, formed by a portion protruding in a widthwise direction of the bottom plate member.

14. A ehangeover system, comprising:

a pair of left and right endless rotary bodies installed along a main conveying path;

a multiplicity of article support bodies each attached between the endless rotary bodies and having a direction perpendicular to the main conveying path as a lengthwise direction thereof; and an article transverse pushing body fitted over the article support body and guided thereby, wherein the endless rotary bodies are supported and guided on the side of a main frame via guided members, a cover body for closing the endless rotary bodies from above is disposed in the upper part of the main frame, the uppermost surface of the cover body is positioned at the same level as the upper surface of the article support body, the inner end portion of the cover portion is formed by a tilted upper surface that is tilted downward as it extends inwardly with respect to the upper surface of the article support body, a branch path of the main conveying path is provided outwardly at the side of the main frame, and the branch conveying surface of the branch path is positioned at the same level as the uppermost surface of the cover body.

15. The changeover system according to claim 14, wherein a rising section is formed upward on the upper part of the main frame, the cover body is formed into an inverted L shape by a side plate section and an upper plate section that is bent at a riglit angle inwardly from the upper portion of the side plate section, the side plate section is fixed to the main frame side in a state of outward abutment against the rising section, and the uppermost surface and tilted upper surface are formed by the upper plate section.

16. The changeover system according to claim 15, wherein an upward facing receiving surface positioned outside the rising section is formed at the upper part of the main frame, and the cover body is fixed to the main frame side in a state where the side plate section abuts against the rising section from outside and the lower end of the side plate section abuts against the receiving surface.

17. The changeover system according to claim 14, wherein the cover body is formed into an inverted L shape by a side plate section and an upper plate section that is bent at a right angle inwardly from the upper portion of the side plate section, the uppermost surface and tilted upper surface are formed by the upper plate section, a concave section is formed on the inner surface side of a corner section formed by the side plate section and upper plate section, and when an article supplied from the article support body side comes into contact with the uppermost surface, the upper plate section bends via the concave section.

18. A changeover system, comprising:

a pair of left and right endless rotary bodies installed along a main conveying path;

a multiplicity of article support bodies each attached between the endless rotary bodies and having a direction perpendicular to the main conveying path as a lengthwise direction thereof; and an article transverse pushing body fitted over the article support body and guided thereby, wherein side brackets are provided at both ends of the article support body, guided members that are supported and guided on the side of a main frame are provided at the side of the side brackets, endless rotary bodies positioned on the outside of the guided members are configured to be capable of coupling and separating by the movement in the lengthwise direction, a rising section is formed upward at the upper part of the main frame, a guide rail section is formed on the inside of the rising section, the upward facing support surface of the guide rail section is positioned at the same level or slightly below the upper end of the rising section and configured to support and guide the guided members, the guided members comprising rotary bodies that can rotate about a central axis extending in the lengthwise direction, the upper end of the rising section is positioned below this central axis, and the upper end of the rising section is positioned below the lower surface of the endless rotary body.

19. The changeover system according to claim 18, wherein a cover body for closing the endless rotary bodies from above is detachably configured with respect to the rising section.

20. The changeover system according to claim 18, wherein the article support body is art ached between the endless rotary bodies via the side brackets provided at both ends thereof, the guide rail section is formed in the upper section of the main frame, the upward facing support surface and inward sidewise guide surface are formed in the guide rail section, and a guided member that is supported and guided by the upward facing support surface and another guided member that is guided by the sidewise guide surface are provided at the side brackets.

21. The changeover system according to claim 18, wherein the endless rotary body is an endless chain.

22. The changeover system according to claim 18, wherein the main frame of the system comprises frame members disposed as a pair respectively at the top and bottom on both sides, and a middle frame member for linking upper and lower frame members and left and right frame members, the lower frame member including a homeward guide rail section protruding inwardly and an upper end extending section positioned above the homeward guide rail section, the homeward guide rail section and the upper end extending section being formed integrally, the homeward guide rail section having an upward facing support surface by which the guided member is guided, the upper end extending section having a sidewise guide surface facing inwardly, and another guided member guided by the sidewise guide surface is provided at the side of the article support body.

23. The changeover system according to claim 22, wherein the sidewise guide surface of the upper end extending surface is positioned inside of the inner surface of the homeward guide rail section.

* * * * *